(12) United States Patent
Ogasawara et al.

(10) Patent No.: US 7,669,573 B2
(45) Date of Patent: Mar. 2, 2010

(54) SCOOTER TYPE VEHICLE

(75) Inventors: Atsushi Ogasawara, Saitama (JP); Toshio Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 521 days.

(21) Appl. No.: 11/527,385

(22) Filed: Sep. 27, 2006

(65) Prior Publication Data

US 2007/0075521 A1   Apr. 5, 2007

(30) Foreign Application Priority Data

Sep. 30, 2005  (JP) ............................. 2005-288582
Oct. 17, 2005  (JP) ............................. 2005-301547

(51) Int. Cl.
  *F02B 75/06* (2006.01)
(52) U.S. Cl. ................................. 123/192.2; 123/192.1
(58) Field of Classification Search ............. 123/192.2, 123/41.86, 572, 196 CP, 198 P, 195 R, 195 HC, 123/195 H; 74/603; 180/219, 218
See application file for complete search history.

(56) References Cited

U.S. PATENT DOCUMENTS

| | | | | | |
|---|---|---|---|---|---|
| 4,617,885 | A | * | 10/1986 | Oshiro et al. ............ | 123/192.2 |
| 4,856,486 | A | * | 8/1989 | Mori et al. ................. | 123/572 |
| 4,915,070 | A | * | 4/1990 | Okui ....................... | 123/196 R |
| 5,078,105 | A | * | 1/1992 | Ito et al. ................. | 123/195 R |
| 5,113,807 | A | * | 5/1992 | Kobayashi ............... | 123/41.74 |
| 6,019,074 | A | | 2/2000 | Otome et al. | |
| 6,481,408 | B2 | * | 11/2002 | Tsutsumikoshi ........ | 123/195 R |
| 7,089,904 | B2 | * | 8/2006 | Morii et al. ............. | 123/196 R |
| 2002/0033162 | A1 | | 3/2002 | Tsutsumikoshi | |
| 2003/0037752 | A1 | | 2/2003 | Nomura | |
| 2004/0124032 | A1 | | 7/2004 | Iizuka et al. | |
| 2005/0016488 | A1 | * | 1/2005 | Kawakubo et al. ....... | 123/192.2 |
| 2007/0062752 | A1 | * | 3/2007 | Sugita et al. ............... | 180/309 |
| 2008/0173274 | A1 | * | 7/2008 | Inui et al. ............... | 123/196 R |

FOREIGN PATENT DOCUMENTS

| | | |
|---|---|---|
| CN | 1152795 C | 6/2004 |
| DE | 3801715 A1 | 8/1988 |
| EP | 0 952 075 A2 | 10/1999 |
| JP | 2061356 | 3/1990 |

(Continued)

*Primary Examiner*—Michael Cuff
*Assistant Examiner*—Hung Q Nguyen
(74) *Attorney, Agent, or Firm*—Birch, Stewart, Kolasch & Birch, LLP

(57) ABSTRACT

A scooter type vehicle provides a pair of right and left frame members in the interior of a vehicle body cover so as to extend substantially horizontally between a head pipe and the front end of a seat. Right and left footrest plates are provided outside on the right and left of the vehicle body cover. An engine is provided between the right and left frame members with the cylinder axis of the cylinder block being provided so as to extend longitudinally, and the center axis of a crankshaft is provided so as to extend laterally and to be located above the upper surfaces of the right and left footrest plates as seen in a side view. A balancer shaft is located below the crankshaft, and the crankshaft and the balancer shaft are sandwiched and supported between the upper and lower case halves with their center axes being located on the joining surface.

6 Claims, 18 Drawing Sheets

FOREIGN PATENT DOCUMENTS

| | | |
|---|---|---|
| JP | 2860793 A | 12/1998 |
| JP | 10324279 | 12/1998 |
| JP | 2001271884 | 10/2001 |
| JP | 2003160084 | 6/2003 |
| JP | 2003-335284 A | 11/2003 |

* cited by examiner

SCOOTER TYPE VEHICLE

CROSS-REFERENCE TO RELATED APPLICATIONS

The present application claims priority under 35 USC 119 to Japanese Patent Application No. 2005-301547 filed on Oct. 17, 2005 and Japanese Patent Application No. 2005-288582 filed on Sep. 30, 2005 the entire contents of which are hereby incorporated by reference.

FIELD OF THE INVENTION

The present invention relates to a scooter type vehicle which is equipped with left and right footrest plates and a vehicle body cover that are provided below a seat. An engine is disposed within the vehicle body cover. The present invention is also directed to a balancer mechanism for an internal combustion engine, which includes a piston that reciprocates within a cylinder chamber, and a crankshaft that rotates in synchronization with the piston.

DESCRIPTION OF BACKGROUND ART

With regard to a motorcycle such as a scooter type vehicle, in order to improve the riding comfort during high speed operation or to improve the turning performance at the time when the vehicle body needs to be tilted, it is necessary to optimize the vehicle's center of gravity. The engine is a heavy load for a motorcycle. With respect to the structure of the engine, the crankshaft is an example of a particularly heavy component.

In a scooter type vehicle, the footrest plate and the vehicle body cover are provided under the rider's seat and are arranged at the longitudinally central portion of the vehicle. In addition, the engine is disposed within the vehicle body cover. A large-sized scooter type vehicle mounted with a parallel-type (so-called "transverse") 2-cylinder engine is conventionally known. See, for example, JP-A No. 2003-335284. This vehicle is provided as an approach to providing a vehicle that operates under a more comfortable driving environment. However, a further increase in the number of cylinders is desired.

In a large-sized scooter type vehicle, the footrest plate is often composed of a pair of right and left footrest plates. These right and left footrest plates are provided so as to extend longitudinally outside on the right and left of the vehicle body cover, respectively. In such an arrangement, the rider is seated on the seat, and steers the vehicle while taking a position with the right and left feet rested on the respective footrest plates so as to straddle the vehicle body cover.

A scooter type vehicle must be designed so as to allow the operator to rest both feet on the footrest plates without difficulty. In order to secure such a stable driving position, a scooter type vehicle is subject to limitations regarding the vertical position of the footrest plates relative to the seat as well as limitations regarding the lateral length of the vehicle body cover (the distance between the right and left footrest plates).

For example, according to JP-A No. 2003-335284, in related scooter type vehicles with a 2-cylinder engine in which cylinder chambers are arranged laterally side by side, the center axis position of the crankshaft as a heavy load is at substantially the same height as the footrest plates. Accordingly, the center of gravity of the vehicle is located at a relatively low position near the footrest position. However, depending on the vehicle's concept with regard to the turning performance or comfort, there may be cases where a relatively high center of gravity is preferred. Further, when the operating portion of the engine such as the crankshaft is disposed in the vicinity of the footrest plates as described above, this may cause the vibration of the operation portion to be readily transmitted to the footrest plates, which gives rise to the problem of how to reduce vibration acting on the operator's feet.

In addition in an internal combustion engine, vibration is generated as the piston makes reciprocating motion. In order to remove this vibration, a balancer weight such as a heavy load is rotated in synchronization with the reciprocating motion of the piston to thereby cancel out the vibration. See, for example, JP Patent No. 2860793. The balancer weight is provided on a balancer shaft that is rotatably disposed and adapted to rotate in synchronization with the crankshaft, that is, with the reciprocating motion of the piston.

However, according to JP Patent No. 2860793, the related balancer weight is mounted to a dedicated balancer shaft to which only the balancer weight is mounted. Accordingly, in addition to the balancer shaft, a gear train for rotationally driving the balancer shaft, a support member for rotatably supporting the balancer shaft, and so on are required as dedicated components, which may cause not only an increase in the number of parts but also an increase in the overall size of the internal combustion engine because a dedicated space for arranging these components must be secured within the housing.

SUMMARY AND OBJECTS OF THE INVENTION

In view of the above-mentioned problem, it is an object of an embodiment of the present invention to provide a scooter type vehicle designed to accommodate a wide variety of concepts.

In order to attain the above-mentioned object, according to an embodiment of the present invention, there is provided a scooter type vehicle having right and left footrest plates and a vehicle body cover that are provided below a seat, with an engine being disposed in an interior of the vehicle body cover. A head pipe is provided at a front end portion of the scooter type vehicle so as to extend substantially vertically. A pair of right and left frame members are provided in the interior of the vehicle body cover so as to extend substantially horizontally between the head pipe and a front end of the seat. The right and left footrest plates are provided outside on the right and left of the vehicle body cover. The engine includes a piston together with a crankshaft that rotates in synchronization with the piston and a cylinder block that slidably accommodates the piston in a cylinder chamber formed in an interior thereof The engine is provided between the right and left frame members with a cylinder axis of the cylinder block extending longitudinally and a center axis of the crankshaft extending laterally and being located above upper surfaces of the right and left footrest plates as seen in side view.

Further, in an embodiment of the present invention, an operating portion of the engine, which includes the piston, the crankshaft, and a connecting rod connected to the piston and the crankshaft, is located above the upper surfaces of the right and left footrest plates. Further, three cylinder chambers are formed side by side in the interior of the cylinder block with the piston being disposed in each of the three cylinder chambers. The cylinder block is provided between the right and left frame members in proximity to each of the right and left frame members, with the three cylinder chambers being arranged laterally in a side by side relationship.

Further, in an embodiment of the present invention, an integral unit housing is formed by the cylinder block and a crankcase that is coupled to the rear of the cylinder block rotatably accommodates the crankshaft. A power transmission mechanism is disposed in the crankcase with the power transmission mechanism including an input shaft that rotates when power from the crankshaft is transmitted to the input shaft and an output shaft that rotates when power from the input shaft is transmitted and outputs the power to the rear wheel. The input shaft is provided in a rear of the crankshaft. The output shaft is provided below the input shaft Further, in an embodiment of the present invention, the unit housing includes a cylinder head coupled in front of the cylinder block and forms a combustion chamber together with the piston and in the interior of the vehicle body cover. In addition, an exhaust pipe is provided so as to extend downward from the cylinder head with the exhaust pipe being in communication between the combustion chamber and to the exterior thereof for exhausting gas in the combustion chamber to the outside.

Further, in an embodiment of the present invention, a head cover that is provided to a front end of the engine is provided between the right and left frame members in proximity to each of the right and left frame members and in the interior of the vehicle body cover, a radiator for cooling the cooling water of the engine is provided below the head cover.

In the scooter type vehicle according to an embodiment of the present invention constructed as described above, the center axis of the crankshaft is arranged above the upper surfaces of the footrest plates as seen in a side view. Since the crankshaft, which is a relatively heavy load structure of the engine, is arranged at a position higher than the footrest plates, the center of gravity of the engine can be set high as compared with the related art. The higher center of gravity of the vehicle allows for an adaptation to a wide variety of concepts.

When, in addition to the crankshaft, the operating portion of the engine such as the piston and the connecting rod is arranged above the upper surfaces of the right and left footrest plates, as compared with the related arrangement in which the operating portion is arranged at substantially the same height as the footrest plates, the footrest plates and the operating portion are spaced further away from each other, so the vibration accompanying the operation of the engine is not readily transmitted to the footrest plates. Vibration transmitted to the feet is thus reduced, thereby achieving an enhanced comfort.

Further, when three cylinder chambers are provided in the cylinder block, and the cylinder block is provided between the right and left frame members in proximity to each of the right and left frame members, the required cylinder capacity of the engine is distributed among three cylinders, thereby achieving an improvement in quietness and dynamic performance.

Since the center axis of the crankshaft is arranged at a high position as compared with the related art, a predetermined dead space is formed below the crankshaft. Here, by constructing an integral unit housing from the cylinder block and the crankcase, and arranging the input shaft and output shaft of the power transmission mechanism within the crankcase an effective use of this dead space can be achieved. Further, although the arrangement of the center axis of the crankshaft at a high position results in a large elevation difference between the engine side and the rear wheel side, such an elevation difference can be overcome through a shaft arrangement that allows for the effective use of space, thereby making it possible to construct a power unit (engine and power transmission mechanism) capable of efficiently transmitting power from the engine located at a high position to the rear wheel located at a low position. Further, this shaft arrangement allows a reduction in the longitudinal size of the power unit.

Further, when the exhaust pipe is provided so as to extend downwardly from the cylinder head coupled in front of the cylinder block, the space similarly formed below the engine is utilized to secure a large routing space for the exhaust pipe. It is thus possible to achieve an improvement in exhaust performance and in the dynamic performance of the engine.

Further, when the head cover is provided between the right and left frame members in proximity to the frame members, and the radiator is provided below this head cover, the space similarly formed below the engine is effectively utilized to achieve a reduction in the size of the engine. Further, since the head cover that is located at the front end is disposed so as to cover the portion between the frame members, a flow of air from a forward direction of the vehicle is allowed to flow to the radiator side, thereby achieving an improvement in cooling performance.

In view of the above-mentioned problem relating to the balancer mechanism, it is an object of the present invention to provide a balancer mechanism for an internal combustion engine that allows a reduction in the size of the internal combustion engine.

In order to attain the above-mentioned object, according to an embodiment of the present invention, there is provided a balancer mechanism for an internal combustion engine that includes a piston, a cylinder block having the piston reciprocably disposed within a cylinder chamber formed in an interior of the cylinder block with the cylinder block being disposed so that an axis of the cylinder chamber is tilted in a substantially horizontal direction. A crankshaft is accommodated in an interior space of a crankcase coupled to the cylinder block, and rotates in synchronization with the piston. A balancer shaft rotates in synchronization with the crankshaft and a balancer weight is provided on the balancer shaft and rotating integrally with the balancer shaft, for canceling out vibration resulting from reciprocating motion of the piston. The crankcase is formed by joining upper and lower case halves together with the upper case half being coupled to the cylinder block, and a joining surface between the upper and lower case halves being formed so as to extend substantially vertically as seen in a side view. The balancer shaft is located below the crankshaft, and the crankshaft and the balancer shaft are sandwiched and supported between the upper and lower case halves with their center axes being located on the joining surface.

In a preferred construction, an oil sump that stores a lubricating oil is coupled to a lower part of the lower case half with a pump shaft and a pump drive mechanism being provided in an interior space of the lower case half. The pump shaft is disposed so as to be located to the rear of the balancer shaft with the pump drive mechanism transmitting rotation of the balancer shaft to the pump shaft. An oil pump is provided to the pump shaft with the oil pump being driven by rotation of the pump shaft to pump the lubricating oil from the oil sump. Further, in a preferred construction, a water pump is provided to the pump shaft with the water pump being driven by rotation of the pump shaft to supply cooling water to a water jacket formed in the periphery of the cylinder chamber.

Further, in an embodiment of the present invention, the internal combustion engine includes a cam shaft and a cam drive mechanism with the cam shaft being rotatably mounted in an interior of the cylinder head and adapted to actuate, in accordance with its rotation, a valve for performing suction and exhaust with respect to a combustion chamber. The cam drive mechanism transmits rotation of the crankshaft to the camshaft. The cam drive mechanism includes a cam drive gear provided to the crankshaft, an idle shaft provided between the crankshaft and the camshaft, an idle gear train provided to the idle shaft and rotating integrally with the cam drive gear, and a chain drive mechanism provided between the idle shaft and the cam shaft to transmit rotation of the idle gear train to the camshaft. The balancer shaft and the idle shaft are common to each other with the balancer weight and gears forming the idle gear train are arranged coaxially with each other.

With the balancer mechanism for an internal combustion engine according to the present invention constructed as described above, the balancer shaft to which the balancer weight is mounted is disposed below the crankshaft, and the crankshaft and the balancer shaft are supported while being sandwiched between the upper and lower case halves constituting the crankcase, with their respective center axes being located on the joining surface between the case halves. Accordingly, the bearing structure for the crankshaft and balancer shaft can be simplified, and a dead space is formed below the lower case half, that is, in rear of the balancer shaft. Thus, it becomes possible to dispose the deices, mechanisms, auxiliaries, and the like constituting the internal combustion engine, the power transmission mechanism for transmitting the power from the internal combustion engine, and the like in the newly formed space, thereby achieving a reduction in the overall size of the internal combustion engine.

Further, the oil sump for storing lubricating oil is joined to the lower part of the lower case half, and in the interior space of the lower case half, the pump shaft, which is driven as the rotation of the balancer shaft is transmitted, is disposed in rear of the balancer shaft. The oil pump, which is driven through the rotation of the pump shaft to pump lubricating oil, is provided to the pump shaft. The space where the pump shaft is disposed is located in a lower part of the interior of the lower case half, in proximity to the oil sump. Accordingly, the piping structure for supplying the lubricating oil in the oil sump to the oil pump can be made compact.

Further, when the water pump for pumping cooling water is provided to the pump shaft to which the oil pump is mounted, the pump shafts of the two pumps can be made common to each other, whereby the pump shaft and the driving mechanism for driving the pump shaft can be omitted to thereby achieve a further reduction in the number of parts and in the overall size of the internal combustion engine.

Further, when the balancer weight is provided to the idle shaft constituting the cam drive mechanism, the idle shaft and the balancer shaft are made common to each other. Accordingly, the balancer mechanism can be constructed while omitting a shaft, bearing structure, and gear train dedicated to the balancer mechanism, thereby achieving a reduction in the number of parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 8:
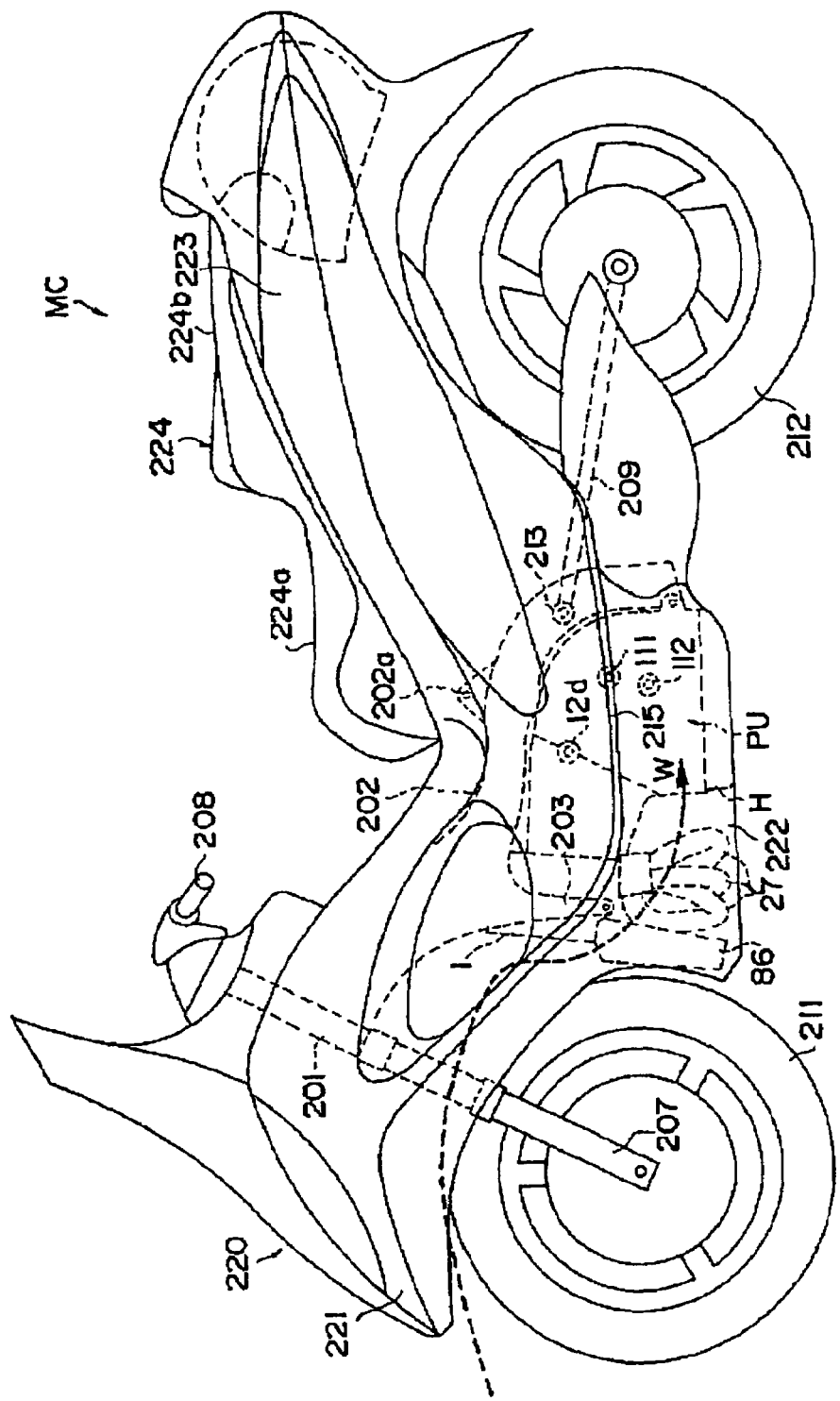
FIG. 8 is a left side view of a motorcycle that is the scooter type vehicle according to the present invention.
Figure 9:
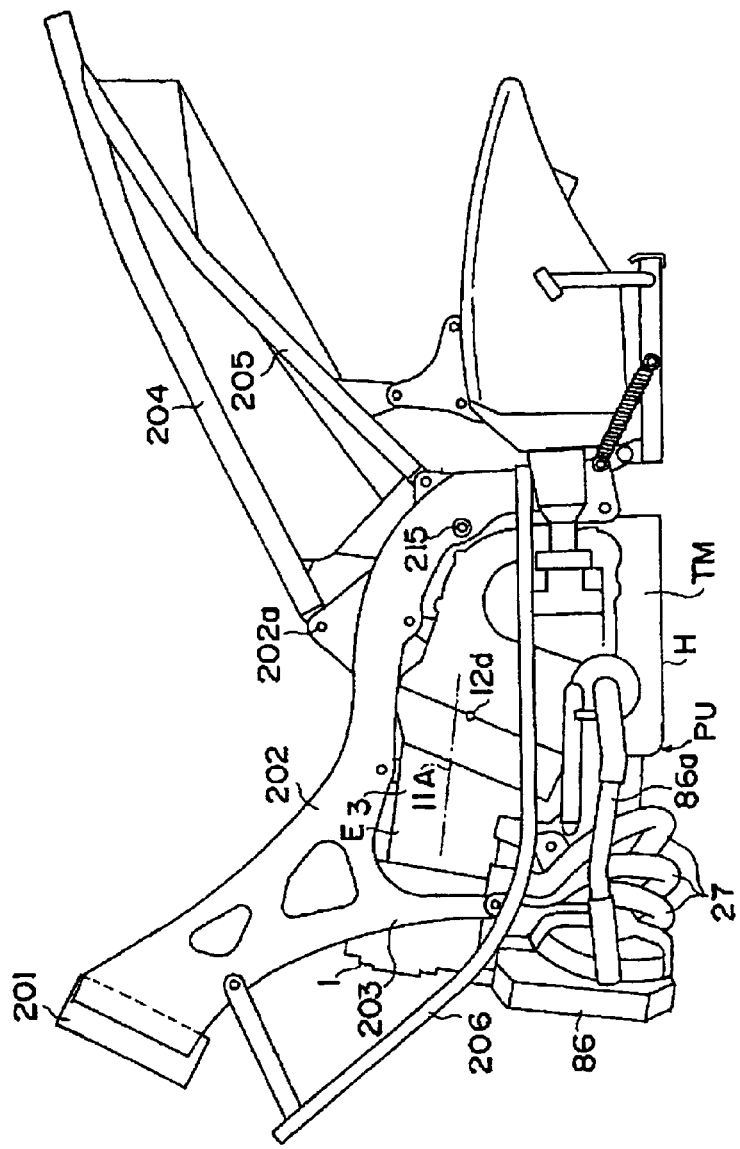
FIG. 9 is a partial left side view showing the frame structure of the motorcycle.

Preferred embodiments of the present invention will now be described with reference to the drawings. In the following description, it is assumed that in the drawings, that the direction of the arrow U is upward, the direction of the arrow F is forward, and the direction of the arrow R is rightward. FIG. 8 is a left side view of a motorcycle MC as a scooter type vehicle according to the present invention. FIG. 9 partially illustrates the frame structure of the motorcycle.

The motorcycle MC includes a frame structure composed of a head pipe 201 provided to the front end portion of the vehicle with a pair of left and right upper members 202 extending rearwardly from the head pipe 201 and a pair of left and right down members 203 that branch off from the upper members 202 and extend integrally downwardly so that an engine E is arranged on the inner side thereof. A pair of left and right seat rails 204 are coupled to the upper members 202 via a coupling portion 202a and are provided so as to extend rearwardly and diagonally upwardly from an upper part of the upper members 202. A support frame 205 supports the seat rails 204 from below. Floor brackets 206 are provided which extend rearwardly from an upper part of the upper members 202 and on which step floors are placed.

In the motorcycle MC, a front fork 207 is steerably mounted to the head pipe 201. A front wheel 211 is rotatably mounted to the lower end of the front fork 207, and a steering handlebar 208 is mounted to the upper end thereof. A rear-wheel rocking pivot shaft 213 is mounted to the upper members 202, and a rear fork 209 is pivotally coupled to the pivot shaft 213 and a rear wheel 212, thereby making the rear fork 209 rockable and making the rear wheel 212 rotatable. The engine E is arranged in the space enclosed by the respective pairs of left and right upper members 202 and down members 203.

Figure 10:
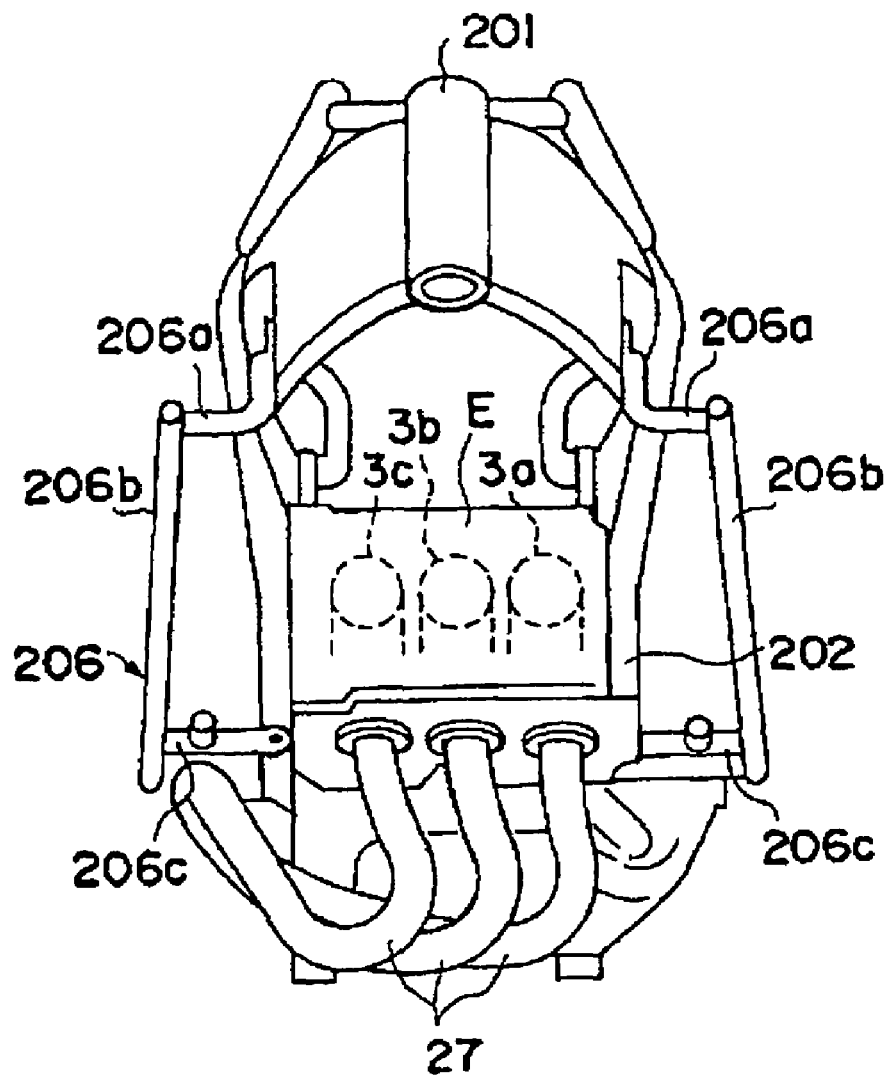
FIG. 10 is a front view of the frame structure as seen from the front of the vehicle.

As shown in FIG. 10, a pair of left and right floor brackets 206 are composed of front sub pipes 206a, 206a provided so as to extend to the left and right and diagonally downwardly from the upper members 202. Main pipes 206b, 206b are provided so as to extend diagonally rearwardly and downwardly from the front sub pipes 206a, and rear sub pipes 206c, 206c connecting between the rear end portions of the main pipes 206b and the rear end portions of the upper members 202. A predetermined floor member is covered over each of the left and right main pipes 206b, 206b, thereby forming a pair of left and right step floors 215.

A cover member 220 is attached to the motorcycle having the frame structure as described above so as to cover the frame structure. The cover member 220 is composed of a front cover member 221 covering the front portion of the head pipe 201 and the like, an intermediate cover member 222 provided in the rear of the front cover member 221. A rear cover member 223 is provided in the rear of the intermediate cover member 222 for covering the rear portion of the vehicle. A seat member 224 is detachably mounted to the upper part of the rear cover member 223 and located above the seat rails 204.

The intermediate cover member 222 is attached so as to cover the upper members 202 and the down members 203, and accommodates a power unit PU. Further, the front cover member 221 is attached so as to cover an upper part of the front wheel 211. When the motorcycle MC is being operated, an airflow W from forward indicated by the broken line in FIG. 8 passes in between the front cover member 221 and the front wheel 211 and introduced into the intermediate cover member 222.

The seat member 224 is a tandem-type seat equipped with a rider's seat 224a formed in the front and a pillion seat 224b formed in rear of the rider's seat 224a. The step floors 215 are mounted above the floor brackets 206 constituting the frame member and consist of a right and left pair. The rider and pillion passenger seated on the seat member 224 rest their feet on the step floors 215 during running of the vehicle, thus allowing them to secure a stable running position. Further, a storage box for storing a helmet or the like is formed under the detachable seat 224.

The power unit PU that is mounted on the motorcycle MC as described above will be described with reference to FIGS. 1 to 7. The power unit PU consists of the engine E and a power transmission mechanism TM. Further, the power unit PU is composed of a head cover 1, a cylinder head 2, a cylinder block 3, a lower case 4, a side cover 5, and a bevel gear case 6. These components are coupled together to form an integral unit housing H. It should be noted that the head cover 1, the cylinder head 2, the cylinder block 3, the lower case 4, and the side cover 5 form a housing on the engine E side, and the lower case 4, the side cover 5, and the bevel gear case 6 form a housing on the power transmission mechanism TM side. The housing on the engine side and the housing on the power transmission side are integrated together by means of the lower case 4.

The cylinder block 3 is a large-sized housing member wherein a cylinder portion 3A is provided with three cylinder bores 3a, 3b, 3c arranged laterally side by side therein. An upper crankcase portion 3B forming the upper half of a vertically split crankcase 12A are integrated with each other. The cylinder block 3 is disposed in the motorcycle so that a cylinder axis 11A is tilted forward, with the cylinder portion 3A being located in the front, and the upper crankcase portion 3B being located in the rear. A piston 11 is disposed in each of the cylinder bores 3a to 3c so as to be slidable in the direction of the cylinder axis 11A.

The lower case 4 is a large-sized housing member in which a lower crankcase portion 4A forming the lower half of the vertically split crankcase 12A, and a transmission case portion 4B accommodating the power transmission mechanism TM are integrated with each other. The lower case 4 is coupled in the rear of the cylinder block 3 by joining the lower crankcase portion 4A to the upper crankcase portion 3B. As described above, the crankcase 12A of this embodiment is composed of the upper crankcase portion 3B of the cylinder block 3 and the lower crankcase portion 4A of the lower case 4. A crank chamber 12B is formed in the interior of the crankcase 12A, with a crankshaft 12 being accommodated and rotatably supported in the crank chamber 12B. It should be noted that the right side surface of the upper crankcase portion 3B of the cylinder block 3, and the right side surfaces of the lower crankcase portion 4A and transmission case portion 4B of the lower case 4 are open, with the side cover 5 being coupled so as to cover the right side surfaces.

Figure 12:
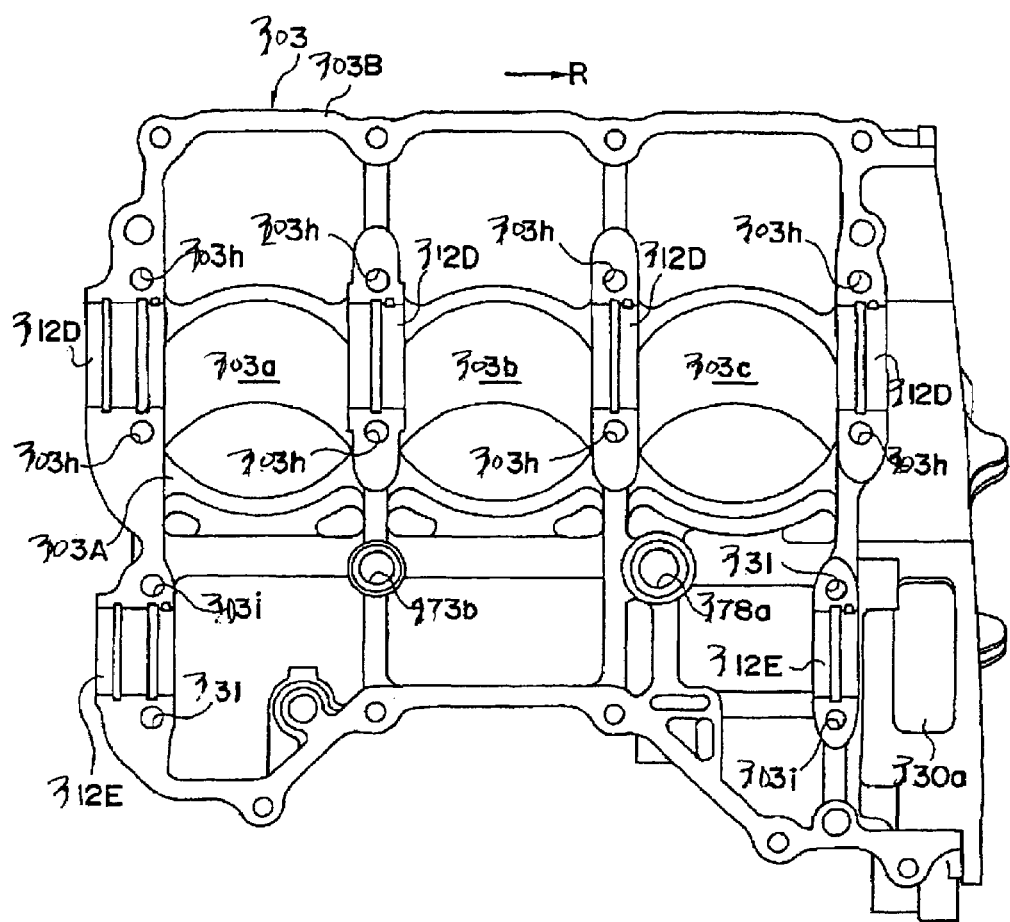
FIG. 12 is a view showing a joining surface of the cylinder block.
Figure 13:
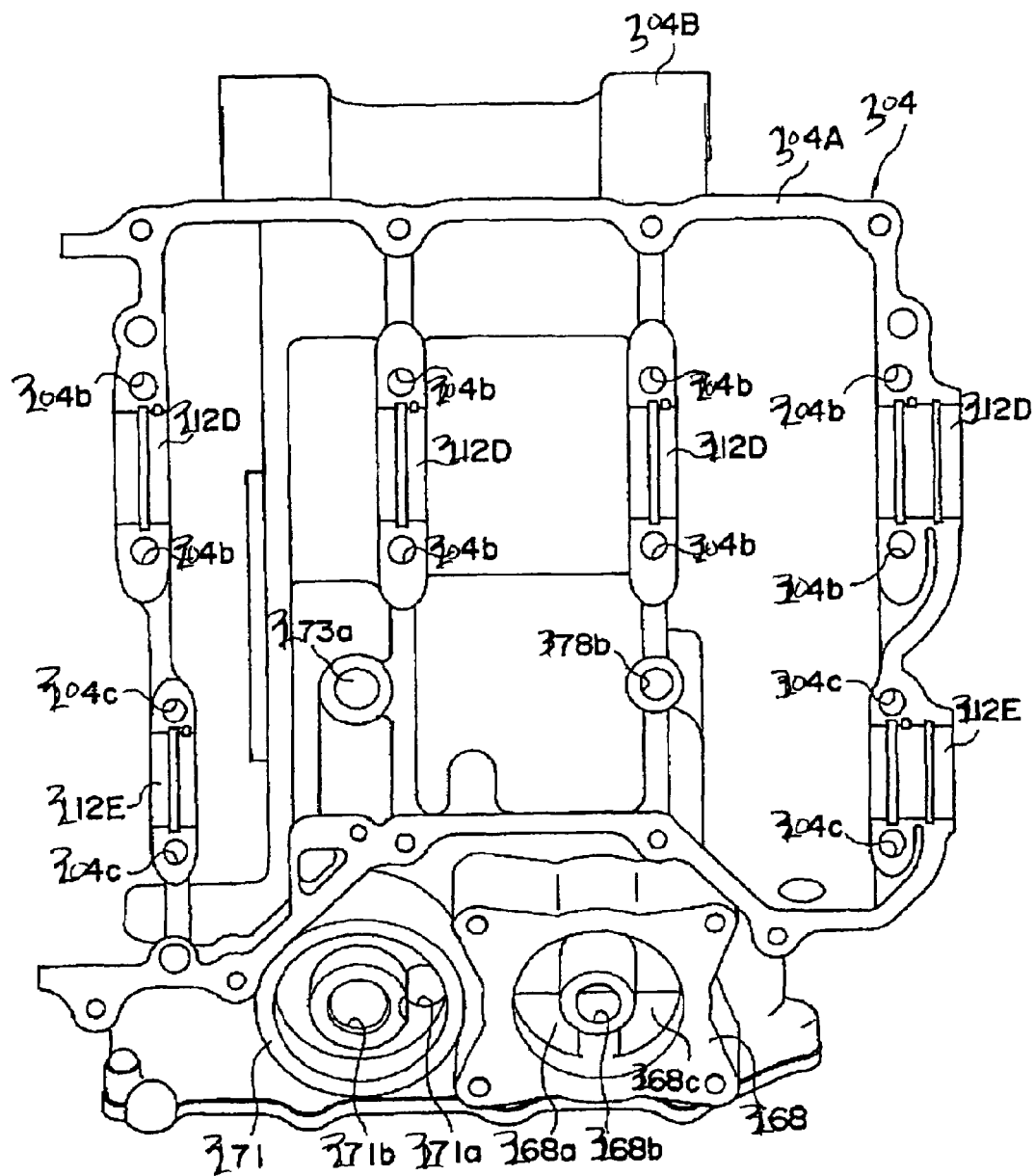
FIG. 13 is a view showing a joining surface of a lower crankcase portion of a lower case.
Figure 17:
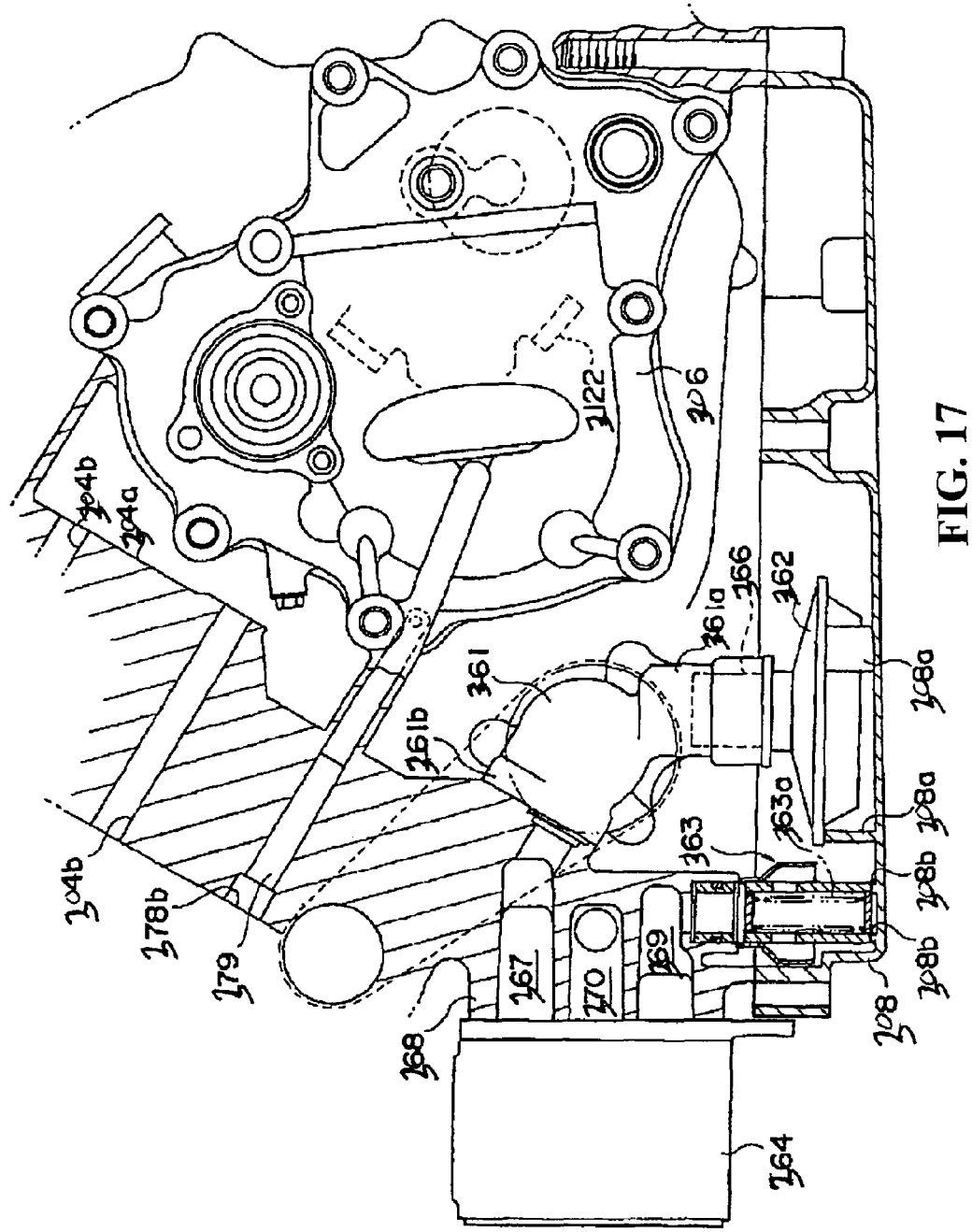
FIG. 17 is a right side sectional view of the lower case and a bevel gear case.

The cylinder block 203 and the lower case 204 are coupled together by fastening the outer peripheral edges of the upper crankcase portion 203B and lower crankcase portion 204A with bolts. Further, as shown in FIGS. 12, 13 and 17, crank bolt insertion holes 304b are formed so as to extend from a partition wall 304a of the lower crankcase portion 304A in the direction perpendicular to a joining surface 312C, and are open on both sides of crank journal portions 312D in the joining surface 312C. In the upper crankcase portion 303B, crank bolt insertion holes 303h are formed at respective positions that come into alignment with the crank bolt insertion holes 304b as the upper crankcase portion 303B is coupled to the lower crankcase portion 304A, the crank bolt insertion hole 303h extending in the direction perpendicular to the joining surface 312C. The crank bolt insertion holes 303h, 304b of the two crankcase portions 303B, 304A are coaxially communicated with each other. It should be noted that a female thread is formed in the crank bolt insertion hole 303h of the upper crankcase portion 303B. Further, as shown in FIGS. 12 and 13, on both sides of idle journal portions 312E as well, idle bolt insertion holes 303i, 304c are formed so as to communicate between the two crankcase portions 303b, 304A in the direction perpendicular to the joining surface 312C. A female thread is formed in the idle bolt insertion hole 303i of the upper crankcase portion 303B.

When coupling the cylinder block 303 and the lower case 304 together, with the crankshaft 312 and a first idle shaft 334, which will be described later, being supported by the journal portions 312D, 312E, stud bolts 396 are inserted into the crank bolt insertion holes 304b from the partition wall 304a of the lower crankcase portion 304A, thereby performing a fastening of each crank journal portion 312D. Likewise, stud bolts (not shown) are inserted from the idle bolt insertion holes 304c of the lower crankcase portion 304B, thereby performing a fastening of each idle journal portion 312E. The coupling using the stud bolts in this way facilitates the assembly operation.

When the cylinder block 3 and the lower case 4 are oriented so that the cylinder axis 11A extends in the vertical direction, a joining surface 12C between the cylinder block 3 and the lower case 4 extends in a horizontal direction. In this embodiment, however, since the cylinder axis 11A is disposed so as to be tilted forward, the joining surface 12C extends substantially vertically while being tilted from the lower front toward the upper rear as seen in side view. Further, the crankshaft 12 is disposed so that its center axis 12d extends laterally and is located on the joining surface 12C.

Figure 3:
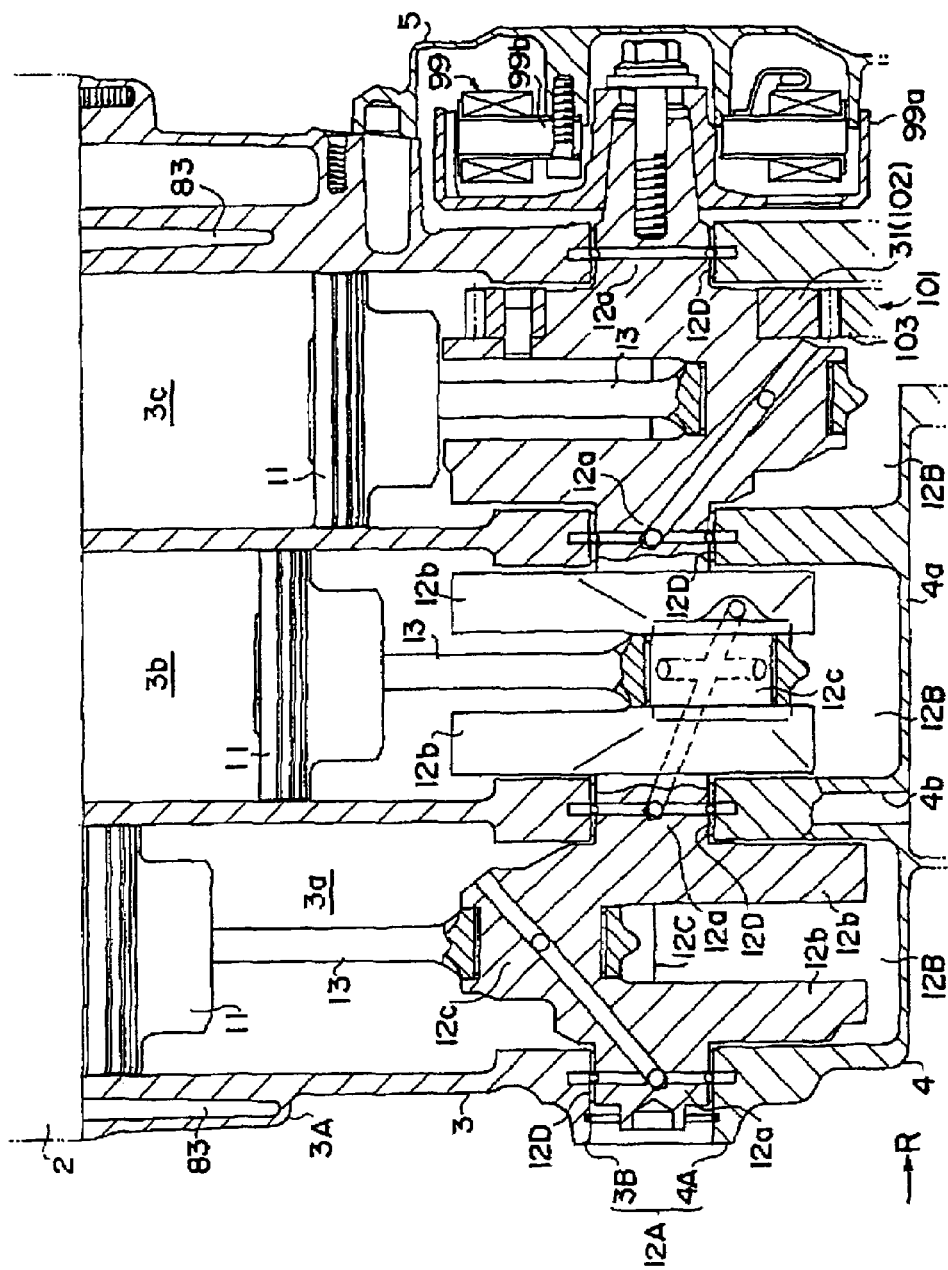
FIG. 3 is a sectional view of the engine as seen from rear.

As shown in FIG. 3, the crankshaft 12 is composed of four journals 12a each having a web 12b integrally formed therewith, and three crank pins 12c connecting between the webs 12b, 12b. Of the components of the engine E, the crankshaft 12 represents a particularly heavy load. The piston 11 is connected to the corresponding crank pin 12c via a connecting rod 13. Accordingly, when the connecting rod 13 is rocked as the piston 11 reciprocates, the crankshaft 12 rotates in synchronization therewith to thereby operate the engine E. As described above, the piston 11, the crankshaft 12, and the connecting rod 13 constitute the operating portion of the engine E.

As illustrated in FIG. 3, a flywheel magnet 99 is mounted to the right end of the crankshaft 12. The flywheel magnet 99 is composed of an outer portion 99a to which the magnet is mounted and which rotates integrally with the crankshaft, and an inner portion 99b to which a coil is mounted and which is fixed to the side cover 5. As the crankshaft 12 rotates, electromagnetic induction is caused by the magnet and the coil to generate alternating current, whereby electric power is supplied to the electrical system of the motorcycle.

It should be noted that the engine E of this embodiment is of an offset crank type in which the cylinder axis 11A does not cross the center axis 12d of the crankshaft 12. With the power unit PU being disposed in the vehicle, as seen in side view, the cylinder axis 11A extends longitudinally above the center axis 12d of the crankshaft 12. Accordingly, as compared with an engine E of a type in which the extension of the cylinder axis 11A crosses the center axis 12d of the crankshaft 12, the cylinder bores 3a to 3a are located at a higher position with respect to the center axis 12d of the crankshaft 12.

Further, the power unit PU is disposed so that as seen in a side view, the center axis 12d of the crankshaft 12 is located above the upper surface of the step floors 215. Further, the cylinder axis 11A extends above the crankshaft, and although the cylinder axis 11A is tilted forward, it is not tilted to the extent that it becomes completely horizontal; the cylinder axis 11A extends upwardly toward the front Accordingly, the piston 11 and the connecting rod 13 are located further above the crankshaft 12 and are disposed at positions further away from the step floors 215. As described above, the operating portion of the engine E of this embodiment is provided generally above the upper surface of the step floors 215.

The cylinder head 2 is coupled to the front portion of the cylinder portion 3A of the cylinder block 3. Three combustion chambers 9 are formed as surrounded by the inner wall surface of the cylinder head 2, the upper surface of the piston 11, and the inner peripheral surfaces of the cylinder bores 3a to 3c. An ignition plug (not shown) is attached to the cylinder head 2, with the distal end of the ignition plug facing each of the combustion chambers 9.

In the cylinder head 2, an intake port 21 and an exhaust port 24 are formed that are open to each of the combustion chambers 9. Further, in the interior of the cylinder head 2, an intake passage 22 is formed with one end in communication with the intake port 21 and with another end in communication with the outside, and an exhaust passage 25 is formed with one end in communication with the exhaust port 24 and with another end in communication with the outside. An intake manifold (not shown) is mounted to an external connection port 23 of the intake passage 22. An intake system equipped with a fuel injection valve and an air cleaner are mounted to the intake manifold. U-shaped exhaust manifolds 27 are each mounted to an external connection port 26 of the exhaust passage 25 so as to extend below the cylinder head 2.

Further, the head cover 1 is coupled to the front portion of the cylinder head 2. A valve chamber 10 is formed as surrounded by the head cover 1 and the cylinder head 2. In the valve chamber 10, there are provided an intake valve 14 for opening and closing the intake port 21, and an exhaust valve 15 for opening and closing the exhaust port 24. Both the valves 14, 15 are normally urged by valve springs 14a, 15a so as to close the intake port 21 and the exhaust port 24, respectively.

In the valve chamber 10, a camshaft holder 7 is interposed between the cylinder head 2 and the head cover 1. Intake and exhaust camshafts 16, 17 with cams 18, 19 integrally formed therewith are rotatably supported while being sandwiched between the cylinder head 2 and the camshaft holder 7. The cam 18 of the intake camshaft 16 abuts on the upper end of the intake valve 14, and the cam 19 of the exhaust camshaft 17 abuts on the upper end of the exhaust valve 15. As the two cam shafts 16, 17 rotate, the intake and exhaust valves 14, 15 are pushed down by the cams 18, 19 against the urging force of the valve springs 14a, 15a, respectively, causing the intake valve 14 to open the intake port 21 and the exhaust valve 15 to open the exhaust port 24. When the intake port 21 is opened, an air fuel mixture from the intake system is supplied to the combustion chamber 9. In addition, when the exhaust port 24 is opened, burnt gas in the combustion chamber 9 is introduced to the exhaust passage 26 and exhausted to the outside.

Figure 2:
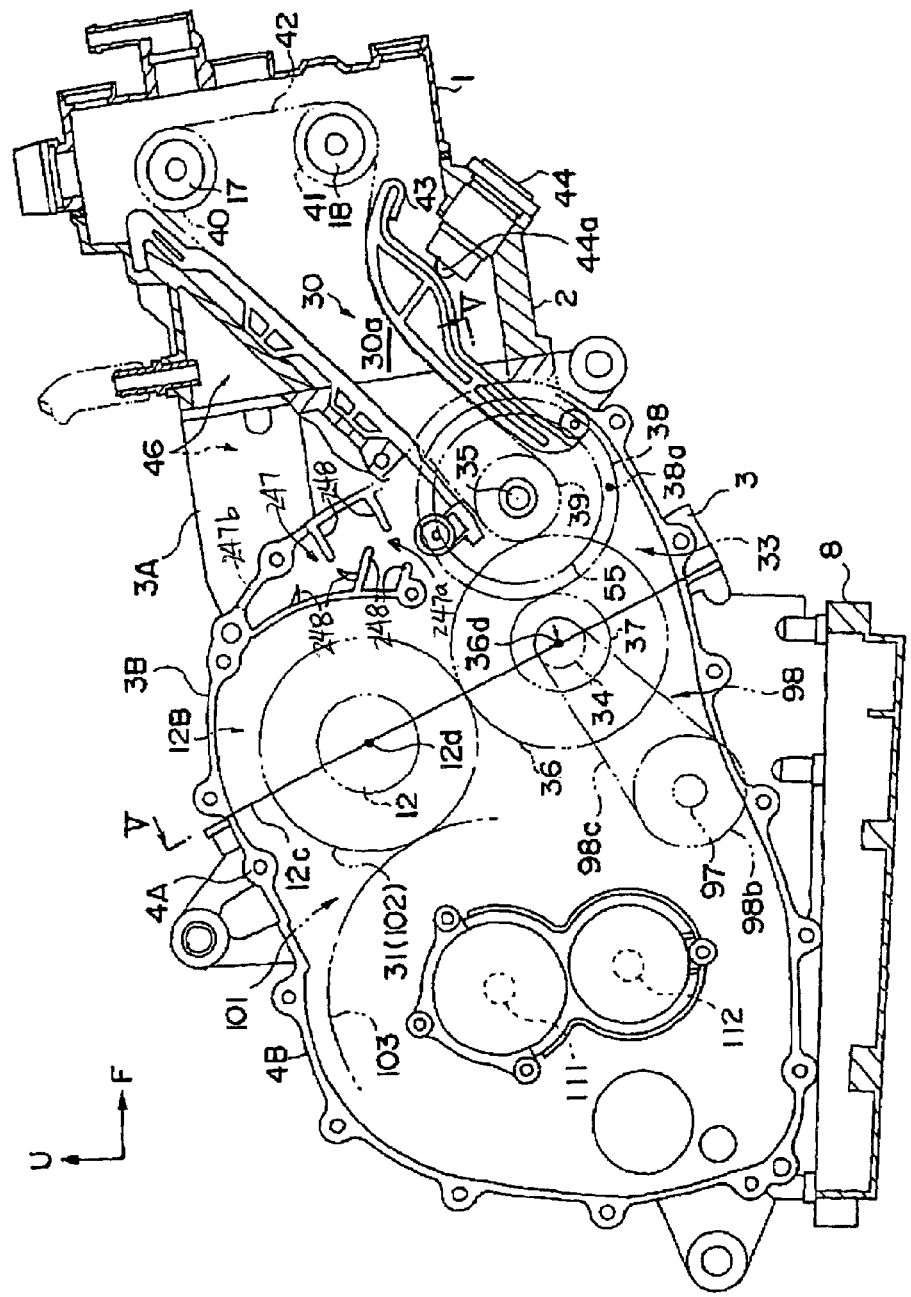
FIG. 2 is a left side sectional view of the power unit.
Figure 5:
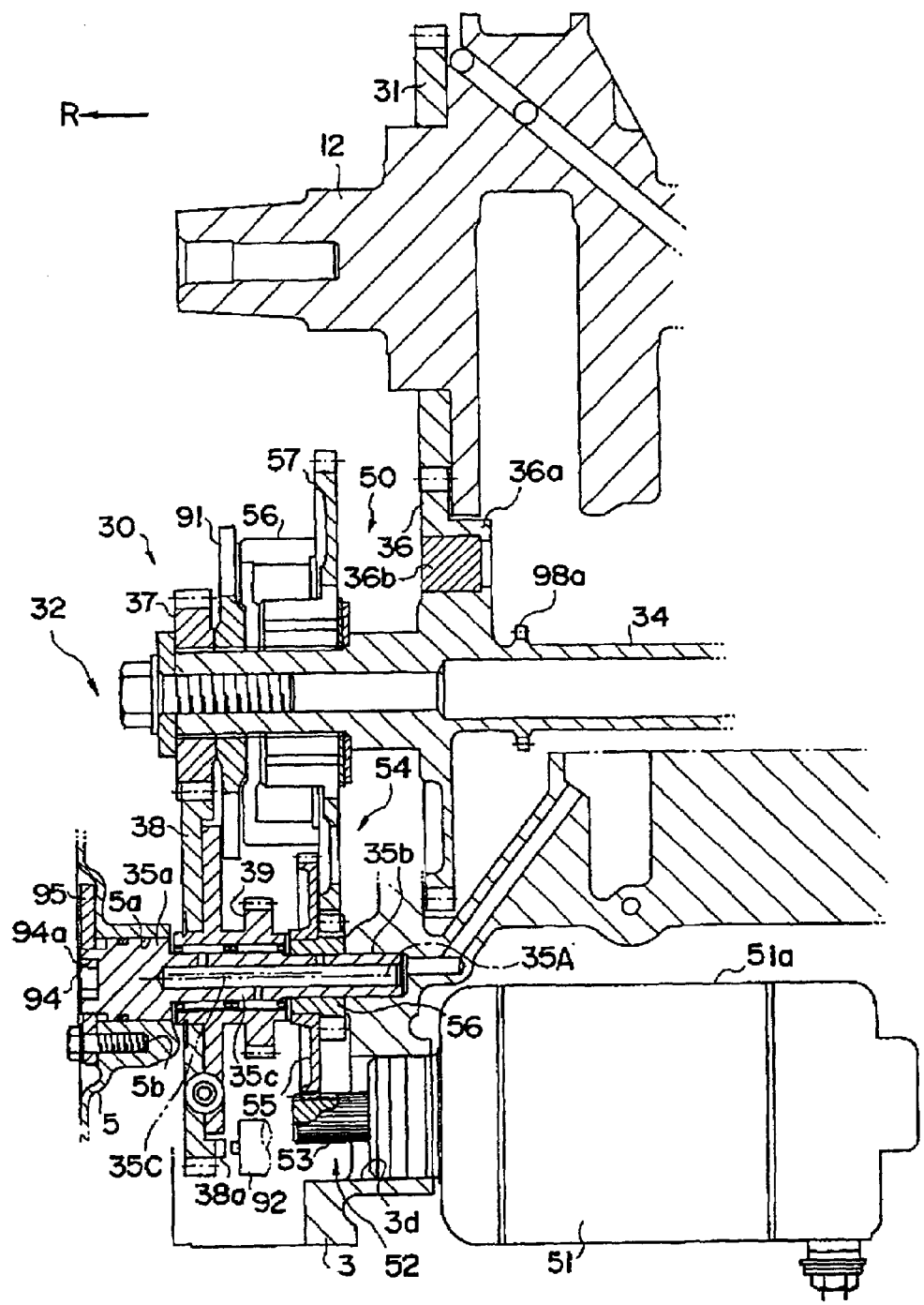
FIG. 5 is a front sectional view as seen in the direction of the arrow V-V of FIG. 2.

The cam shafts 16, 17 each rotate as the rotation of the crankshaft 12 is transmitted via a cam drive mechanism 30. As shown in FIGS. 2 and 5, the cam drive mechanism 30 transmits the rotation of the crankshaft 12 by an idle gear train 33 provided to an idle shaft 32, and further transmits the rotation of the idle gear train 33 to both the cam shafts 16, 17 by a chain drive mechanism.

In this embodiment, the idle shaft 32 is composed of a first idle shaft 34 that is a rotary shaft, and a second idle shaft 35 that is a stationary shaft. The idle gear train 33 is composed of a first idle gear 36 provided to the first idle shaft 34 and brought into meshing engagement with a cam drive gear 31, a second idle gear 37 provided to the first idle shaft 34, and a third idle gear 38 provided so as to be rotatable on the second idle shaft 35 and brought into meshing engagement with the second idle gear 37. Further, the chain drive mechanism is composed of a cam drive sprocket 39 provided to the second idle shaft 34 and rotating integrally with the third idle gear 38, cam driven sprockets provided 40, 41 respectively provided to the two cam shafts 16, 17, and a cam chain 42 suspended between the three sprockets 39 to 41.

In accordance with the rotational speed ratio between the cam drive gear 31, the idle gear train 33, and the three sprockets 39 to 41, the cam drive mechanism 30 causes both the cam shafts 16, 17 to make one rotation for every two rotations of the crankshaft 12. It should be noted that the first idle shaft 34 rotates at the same rotational speed as the crankshaft 12, and the rotation of the second idle gear 37 is transmitted to the third idle gear 38 at ½ the rotational speed. The cam chain 42 is disposed in a chain chamber 30a located on the right of the right cylinder bore 3c and formed so as to communicate between the interiors of the cylinder block 3 and cylinder head 2. Since the second idle shaft 35 is located below the crankshaft 12 as described above, the chain chamber 30a is downwardly offset by the side of the right cylinder bore 3c, and a breather chamber 46 is formed in the space formed above and to the right of the right cylinder bore 3c due to this offset of the chain chamber 30a.

The idle shaft 32 is located below the crankshaft 12, and the second idle shaft 35 is located in front of the first idle shaft 34. The crankshaft 12 is rotatable with its journals 12a being supported by four crank journal portions 12D formed in the joining surface 12C of the crankcase 12A, and the center axis 12d of the crankshaft 12 is located on the joining surface 12C. Further, the first idle shaft 34 is rotatable while being supported by idle journal portions 12E formed at both the right and left ends of the joining surface 12C of the crankcase 12A. Like the crankshaft 12, a center axis 34d of the first idle shaft 34 is located on the joining surface 12C. In this way, the crankshaft 12 and the first idle shaft 34 are supported while being sandwiched between the upper and lower crankcase portions 3B, 4A.

The cam drive mechanism 30 is composed of a cam drive gear 31 provided to the right end of the crankshaft 12 and rotating integrally with the crankshaft 12, a first idle shaft 34 that is disposed in parallel to the crankshaft 12 and supported rotatably, a second idle shaft 35 that is disposed in parallel to the crankshaft 12 and is a stationary shaft, a first idle gear 36 formed integrally with the first idle shaft 34 and brought into meshing engagement with the cam drive gear 31, a second idle gear 37 provided to the first idle shaft 34 and rotating integrally with the first idle shaft 34, a third idle gear 38 provided so as to be rotatable on the second idle shaft 35 and brought into meshing engagement with the second idle gear 37. A cam drive sprocket 39 is provided so as to be rotatable on the second idle shaft 35 and rotating integrally with the third idle gear 38. A first cam driven sprocket 40 is provided to the intake cam shaft 16 and rotates integrally with the intake cam shaft 16. A second cam driven sprocket 41 is provided to the exhaust cam shaft 17 and rotates integrally with the exhaust cam shaft 17 and a cam chain 42 suspended between the three sprockets 39 to 41.

It should be noted that the third idle gear 38 is integrated with the cam drive sprocket 39 via a damper and rotates in synchronization with the cam drive sprocket 39. Further, as shown also in FIG. 6, the cam chain 42 is disposed in a chain chamber 30a located on the right of the right cylinder bore 3c and formed so as to communicate between the interior portions of the cylinder block 3 and cylinder head 2. Contact members 43, 43 contacting the cam chain 42 from the outside are disposed in the chain chamber 30a. Further, a cam chain tensioner 44 is mounted from outside the cylinder head 2. A pressing portion 44a of the cam chain tensioner 44 that is arranged in the chain chamber 30a presses the contact member 43 to apply tension to the cam chain 42, thereby preventing slack in the cam chain 42.

The first and second idle shafts 34, 35 are located below the crankshaft 12. The second idle shaft 35 is located in front of the first idle shaft 34. The crankshaft 12 is rotatable with the journals 12a being supported by the four crank journal portions 12D formed in the joining surface 12C of the crankcase 12A. As described above, the center axis 12d of the crankshaft 12 is located on the joining surface 12C. Further, the first idle shaft 34 is rotatable while being supported by the idle journal portions 12E formed at both the right and left end portions of the joining surface 12C of the crankcase 12A. Like the crankshaft 12, a center axis 34d of the first idle shaft 34 is located on the joining surface 12C. In this way, the crankshaft 12 and the first idle shaft 34 are supported while being sandwiched between the upper and lower crankcase portions 3B, 4A, and the crank journal portions 12D and the idle journal portions 12E form slide bearings with the supply of lubricating oil from a main gallery 65. It should be noted that the second idle shaft 35 is formed as a stationary shaft, with a right end portion 35a of the second idle shaft 35 being retained in a retention hole 5a formed in the side cover 5, and a left end portion 35b thereof being retained in a retention hole formed in the left side surface of the cylinder block 3.

The cam drive gear 31 and the first idle gear 36 are equal in diameter, and the first idle shaft 34 rotates at the same rotational speed as the crankshaft 12. The second idle gear 37 is smaller in diameter than the first idle gear 36 and the third idle gear 38, and rotates together with the cam drive sprocket 39 while rotating on the second idle shaft 35 at a rotational speed ½ of that of the first idle gear 36. In this way, the idle gear train 33 functions as a speed reduction mechanism with a reduction ratio of 2 and transmits the rotation of the cam drive sprocket 39. On the other hand, the three sprockets 39 to 41 are equal in diameter, and both the camshafts 16, 17 make one rotation for each two rotations of the crankshaft 12.

Figure 11:
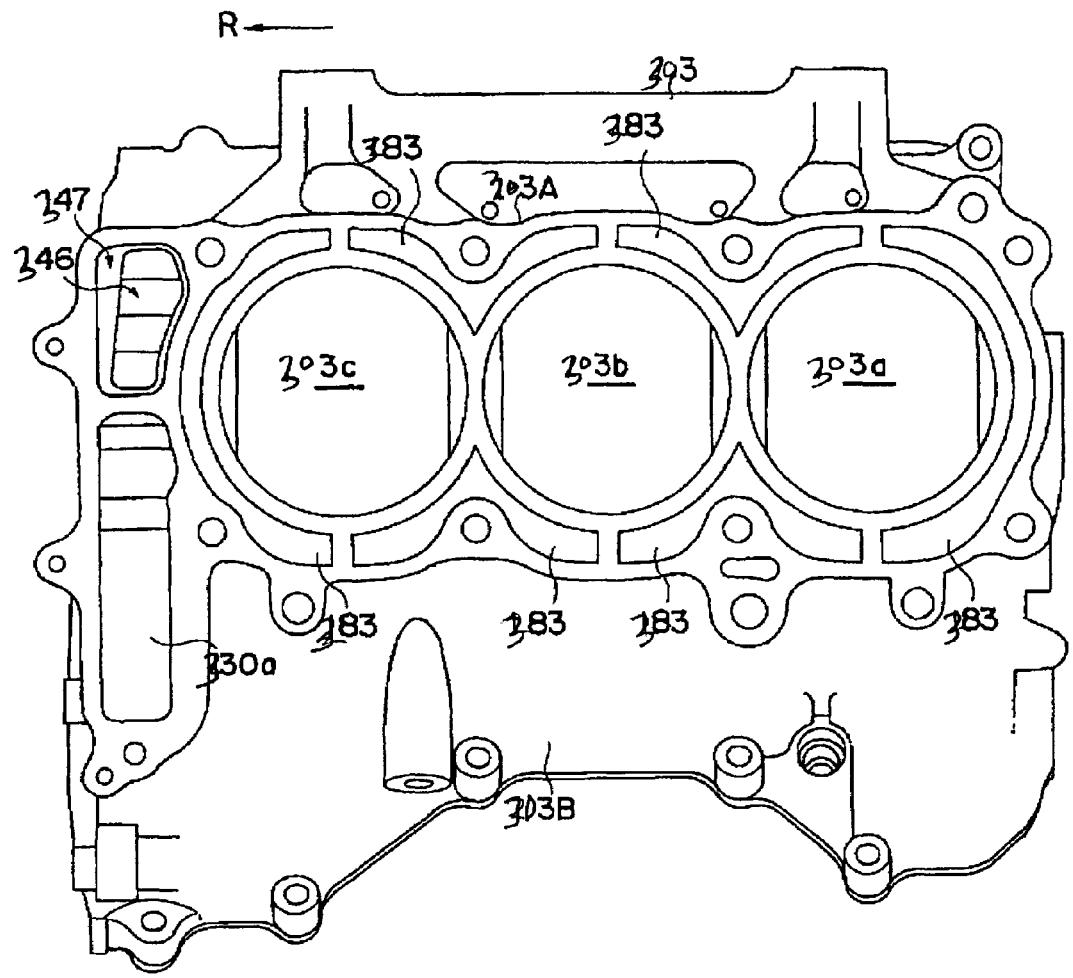
FIG. 11 is a view of a cylinder block as seen in the cylinder axis direction.

Since the first and second idle shafts 34, 35, and the first to third idle gears 36 to 38 are located below the crankshaft 12, in the region surrounded by the cam chain 42, the cam drive sprocket 39 side is offset downwardly and, accordingly, the chain chamber 30a is offset downwardly. As shown in FIG. 2, a breather chamber 46 communicating with the crank chamber 12B is formed in the space above the chain chamber 30a formed due to this offset. The breather chamber 46 is surrounded by the upper rear inner wall surface of the cylinder head 2 and the upper front inner wall surface of the cylinder block 3. As shown in FIG. 11, the breather chamber 246 is located on the right of the right cylinder bore 203c.

Figure 15:
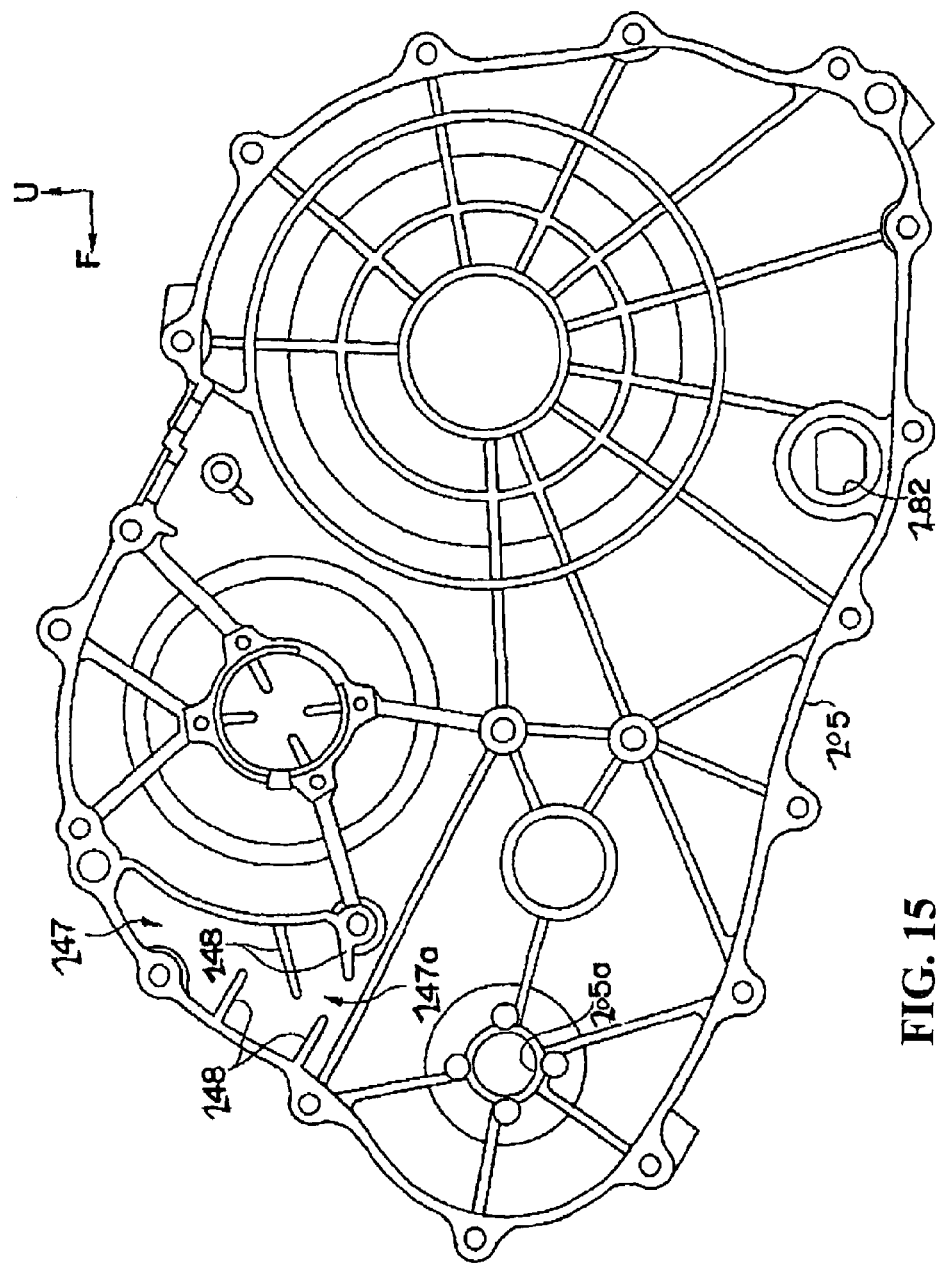
FIG. 15 is a left side sectional view of the side cover.

Further, as shown in FIGS. 2 and 15, ribs 248 are project in an upper front part of the inner wall surface of each of the upper crankcase portion 3B of the cylinder block 3 and of the side cover 5. With the ribs 248 serving as partition walls, a zigzag breather passage 247 is formed as surrounded by the cylinder block 3 and the side cover 5. The breather passage 247 is communicated with the crank chamber 12B at one end 247a and is communicated with the breather chamber 246 at the other end 247b, thus communicating the breather chamber 246 and the crank chamber 12B with each other.

A pipe connecting member 49a is press-fitted in the cylinder head 2 so as to project upwardly. The pipe connecting member 49a is in communication with the breather chamber 46. One end of a blowby gas pipe is connected to the pipe connecting member. The other end of the blowby gas pipe is connected to the clean side of an air cleaner constituting an intake system. It suffices that the other end of the blowby gas pipe be connected to an intake system, and may be connected to, for example, an intake manifold.

With the breather structure 45 equipped with the breather chamber 46 as described above, as the piston 11 is lowered to bring the crank chamber 12B into positive pressure, blowby gas in the interior of the crank chamber 12B flows into the breather passage 247. As the blowby gas passes through the breather passage 247, the oil component in the gas adheres to the ribs 48, thereby promoting gas-liquid separation of the blowby gas. The blowby gas having flown into the breather chamber 246 from the breather passage 247 is guided by the blowby gas pipe and recirculated back to the air cleaner before being supplied to the combustion chamber 9 for combustion.

Further, as shown in FIG. 5, a starter 50 for starting the engine E is provided in the interior space of the upper crankcase portion 3B of the cylinder block 3. The starter 50 has an electric starter motor 51 and is adapted to transmit the driving force of the starter motor 51 to the crankshaft 12 by a speed reducing gear train 52.

The starter motor 51 is mounted to the cylinder block 3 by being fitted into a motor mounting hole 3d formed in the left side surface of the cylinder block 3, with its output shaft being located within the cylinder block 3. The speed reducing gear train 52 is composed of a starter pinion 53 mounted to the output shaft of the starter motor 51, a starter drive gear 55, and a starter gear train 54 consisting of a starter idle gear 56 and a starter driven gear 57. The starter gear train 54 is provided to the first and second idle shafts 34, 35. The starter driven gear 57 is mounted to a one-way clutch 58 provided to the first idle shaft 34.

With the starter 50 as described above, when a cell switch near the handlebar is operated, the starter motor 51 is driven and the starter pinion 53 rotates, causing the first idle shaft 34 to rotate via the starter gear train 53. When the first idle shaft 34 rotates, the first idle gear 36 and the cam drive gear 31 rotate, and the crankshaft 12 is rotationally driven to start the engine E. As the engine E is started and runs idle, the rotational speed of the crankshaft 12 exceeds the rotational speed of the starter driven gear 57, causing the starter driven gear 57 to make idle rotation due to the one-way clutch 58.

Figure 6:
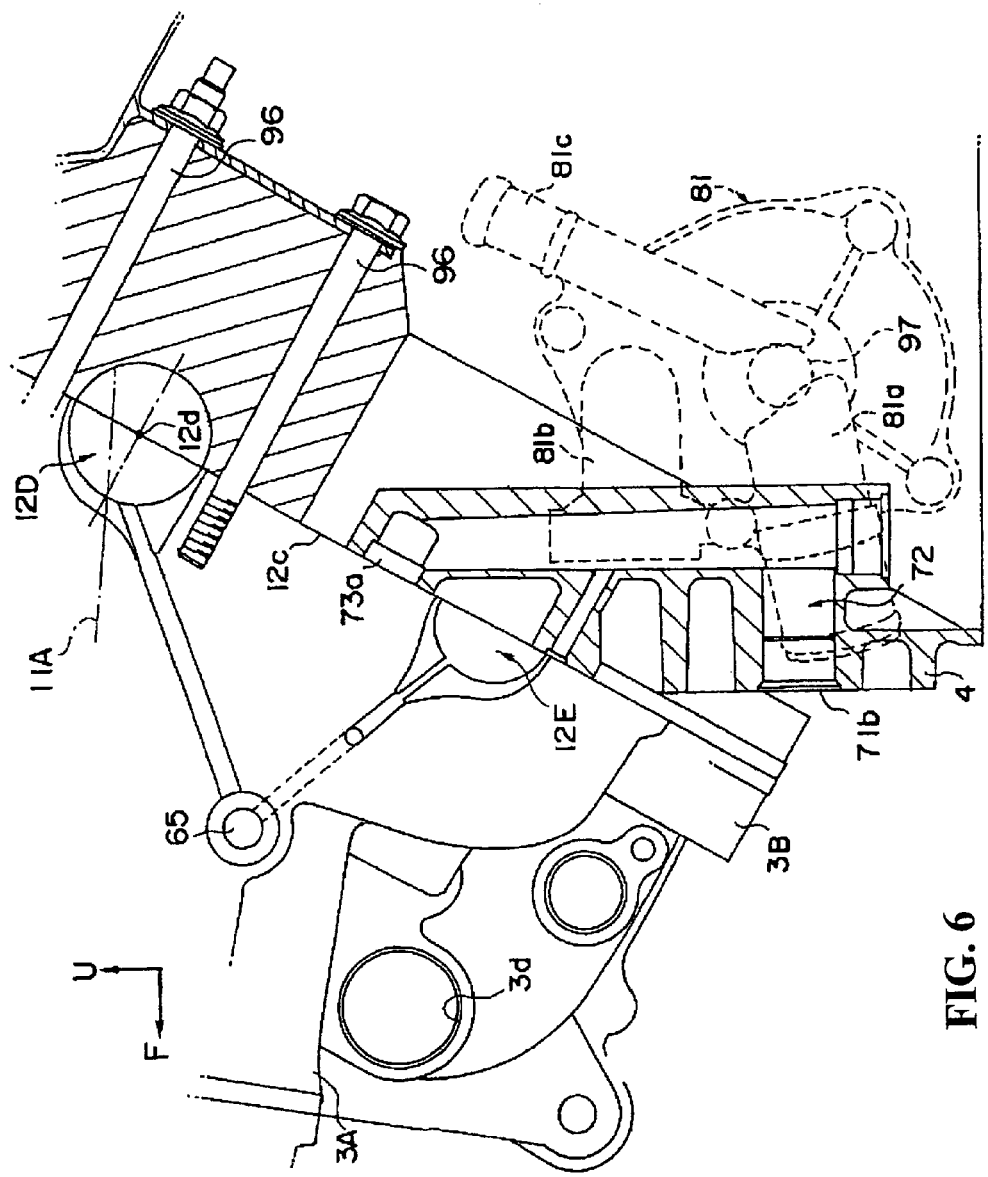
FIG. 6 is a right side sectional view of a cylinder block and a lower case, illustrating the mounting position of a water pump.

It should be noted that in the upper crankcase portion 3B of the cylinder block 3, there are no other devices or mechanisms to be accommodated within the housing H at a portion below the cam chain 42 wrapped around the cam driver sprocket 39 and, as shown in FIG. 5, the left side surface is largely offset to the right. As shown in FIG. 6 as well, in this offset portion, a boss-shaped motor mounting hole 3d is formed in the left side surface of the cylinder block 3. The starter motor 51 is mounted to the cylinder block 3 with its output shaft being fitted in the motor mounting hole 3d so as to be located within the cylinder block 3. When mounted, the starter motor 51 is surrounded by the outer side surface of the cylinder block 3 with a housing portion 51a being located outside the housing H of the engine E.

The speed reducing gear train 52 is composed of a starter pinion 53 mounted to the output shaft of the starter motor 51, a starter drive gear 55, and a starter gear train 54 consisting of a starter idle gear 56 and a starter driven gear 57. The starter drive gear 55 is in meshing engagement with the starter pinion 52 and fitted in the boss portion of the starter idle gear 56 to rotate integrally with the starter idle gear 56. The starter idle gear 56 is rotatable on the second idle shaft 35 that is a stationary shaft, and is mounted to the right end portion of second idle shaft 35. The starter driven gear 57 is mounted to a one-way clutch 58 provided to the first idle shaft 34.

Here, the starter drive gear 55 is larger in diameter than the starter pinion 52 and the starter idle gear 56, and the starter driven gear 57 is larger in diameter than the starter idle gear 56. Accordingly, the speed reducing gear train 52 functions as a speed reduction mechanism for transmitting the driving force of the starter motor 51 after speed reduction.

Further, as shown in FIG. 5, the first idle gear 36, which is provided to the first idle shaft 34 rotating at the same rotational speed as the crankshaft 12, is formed so as to be laterally unsymmetrical, with a partially thick-walled portion. The thick-walled portion 36a functions as a balancer weight. Further, a circular hole is formed so as to extend through the thick-walled portion 36a, and a weight member 36b formed of a material with a large specific gravity (such as tungsten) is mounted in this circular hole. In this way, the cam drive gear 31, the first idle gear 36, the first idle shaft 34, and the balancer weights 36a, 36b constitute a balancer mechanism. As the piston 11 makes one reciprocating motion, the balancer weights 36a, 36b make one rotation, thereby canceling out vibration.

Further, at the left end portion of the first idle shaft 34 as well, a weight member (not shown) is mounted integrally in a rotatable fashion. In this way, the cam drive gear 31, the first idle gear 36, the thick-walled portion 36a serving as a balancer weight, and the weight member 36b constitute a balancer mechanism. As the piston 11 makes one reciprocating motion, the thick-walled portion 36a and the weight member 36b make one rotation, thereby canceling out vibration that may be generated following the reciprocating motion of the piston 11.

Further, as shown in FIG. 5, the first idle shaft 34 that rotates at the same rotational speed as the crankshaft 12 is provided with a rotation pulsar 91 disposed between the second idle gear 37 and the one-way clutch 58 so as to rotate integrally with the first idle shaft 34. Detection of the rotational speed or crank angle of the crankshaft 12 is thus performed.

As described above, the first idle shaft 34 is used as the shaft common to the cam drive mechanism 30, the starter 50, and the balancer mechanism. Likewise, the cam drive gear 31 and the first idle gear 36 are used as a common gear train for effecting transmission of power with the crankshaft 12, whereby a plurality of dedicated shafts or gear trains for the respective mechanisms are omitted to thereby achieve a reduction in the size of the engine E.

As shown in FIG. 2, a pump shaft 97 is rotatably disposed so as to extend laterally while being located in a lower part of the interior space of the lower crankcase portion 4A of the lower case 4, that is, in rear of the first idle shaft 34. The pump shaft 97 is driven as the rotation of the first idle shaft 34 is transmitted to the pump shaft 97 by a pump drive mechanism 98. As shown in FIGS. 2 and 5, the pump drive mechanism 98 is composed of a pump drive sprocket 98a formed integrally with the first idle shaft 34, a pump driven sprocket 98b provided to the pump shaft 97 and rotating integrally with the pump shaft 97, and a pump chain 98c suspended between both the sprockets 98a, 98b.

An oil pump is mounted to the left end portion of the pump shaft 97. The oil pump is driven as the pump shaft 97 rotates. When the oil pump is driven, the lubricating oil stored in an oil sump 8 is sucked in from a strainer disposed in the oil sump 8 to be introduced to an intake pipe. After being introduced to the intake pipe and flowing into the oil pump, the lubricating oil is pumped to a pump discharge oil passage and passes through oil passages formed in the interiors of the lower case 4 and cylinder block 3 to be introduced to a main gallery 65 formed so as to extend by the side of the cylinder bores 3a to 3c. An oil passage communicating between the main gallery 65 and each of the crank journal portions 12D and idle journal portions 12E is formed, and lubricating oil is supplied to the respective lubricating portions via this oil passage.

Further, as shown in FIG. 6, the cooling device of the engine E of this embodiment is composed of a water pump 81 for pumping cooling water, a radiator 86 for cooling the cooling water, and a thermostat (not shown) for adjusting the temperature of the cooling water, and is provided with respective pipes and passages for connection between the respective devices or with a water jacket 83 formed so as to surround the periphery of the cylinder bores 3a to 3c.

The water pump 81 includes a casing member having three pipe connecting portions consisting of a discharge pipe connecting portion 81a, a radiator pipe connecting portion 81b, and a bypass pipe connecting portion 81c that are integrally formed with the casing member. The water pump 81 is mounted to the right end portion of the pump shaft 97. An impeller (not shown) that rotates integrally with the pump shaft 97 is mounted in the interior of the casing. When the impeller rotates as the pump shaft 97 rotates, the cooling water sucked into the casing from the radiator pipe connecting portion 81b or the bypass pipe connecting portion 81c is pumped to the outside from the discharge pipe connecting portion 81a. In this way, according to this embodiment, the drive shaft is shared between the oil pump and the water pump 81, thereby achieving a reduction in the size of the engine E.

Figure 1:
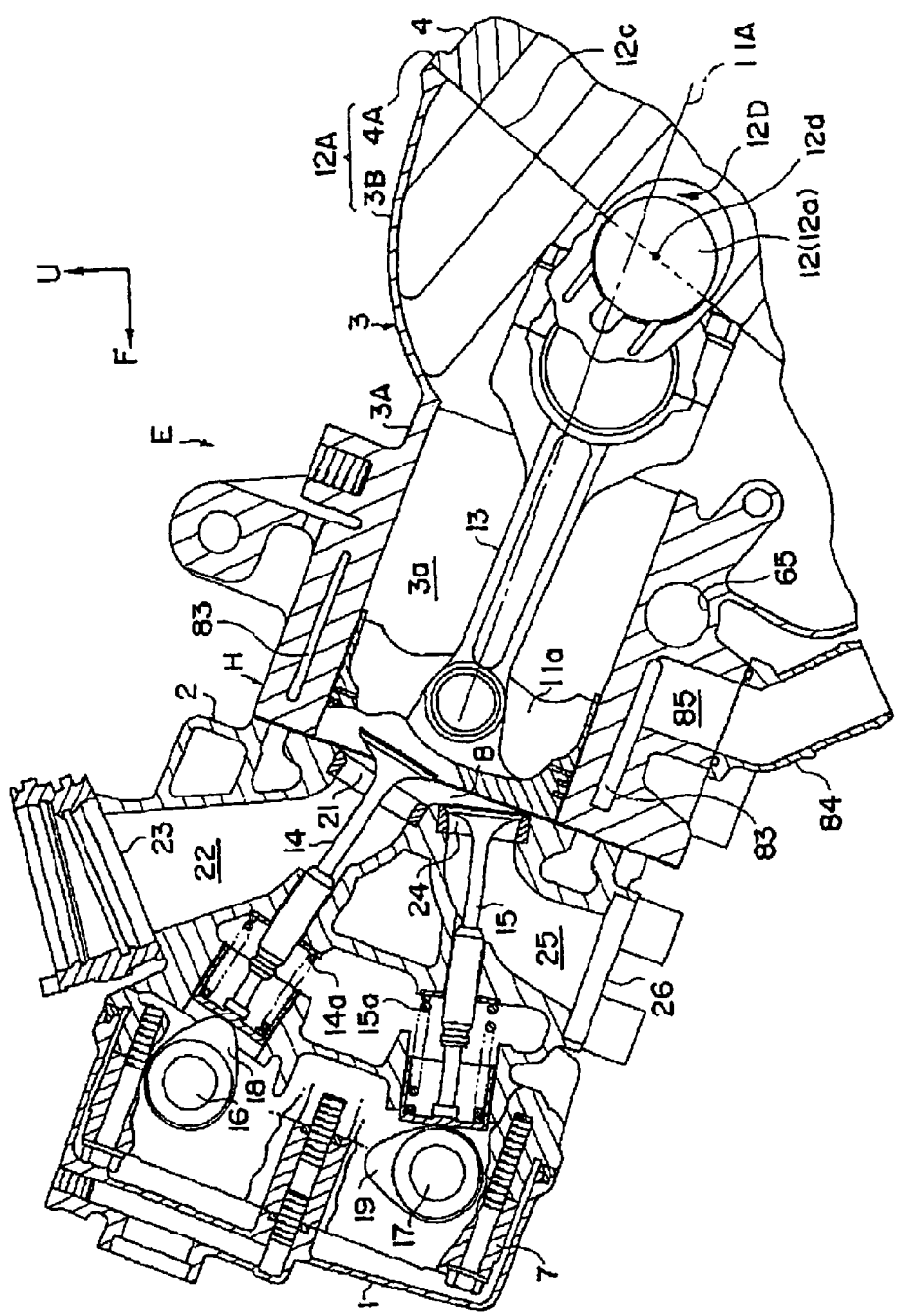
FIG. 1 is a right side sectional view showing an engine of a power unit mounted in a scooter type vehicle according to the present invention.

A discharge pipe (not shown) is connected to the discharge pipe connecting portion 81a. The discharge pipe extends outside the unit housing H from an extraction opening formed in the side cover 5, and is connected to a pipe connecting portion 84 attached to the cylinder portion 3A of the cylinder block 3 as shown in FIG. 1. The pipe connecting portion 84 is communicated with a cooling water passage 85 formed in the interior of the cylinder block 3, and is further communicated with the water jacket 83 via the cooling water passage 85.

The engine E is cooled as the cooling water discharged from the water pump 81 flows into the water jacket 83. The cooling water whose temperature has increased due to heat exchange during its passage through the water jacket 83 is introduced to the radiator 86 via a pipe (not shown) and cooled, before being recirculated back from the radiator pipe connecting portion 81b to the water pump 81 via a pipe 86a. It should be noted that a thermostat is interposed in the pipe for introducing the cooling water from the water jacket 83 to the radiator 86, and there is provided a bypass passage (not shown) that connects between the thermostat and the bypass pipe connecting potion 81c of the water pump 81. When the temperature of the cooling water passing through the thermostat is equal to or lower than a predetermined temperature, the cooling water from the water jacket 83 is introduced to the bypass pipe without passing through the radiator 86 and recirculated back to the water pump 81.

Figure 4:
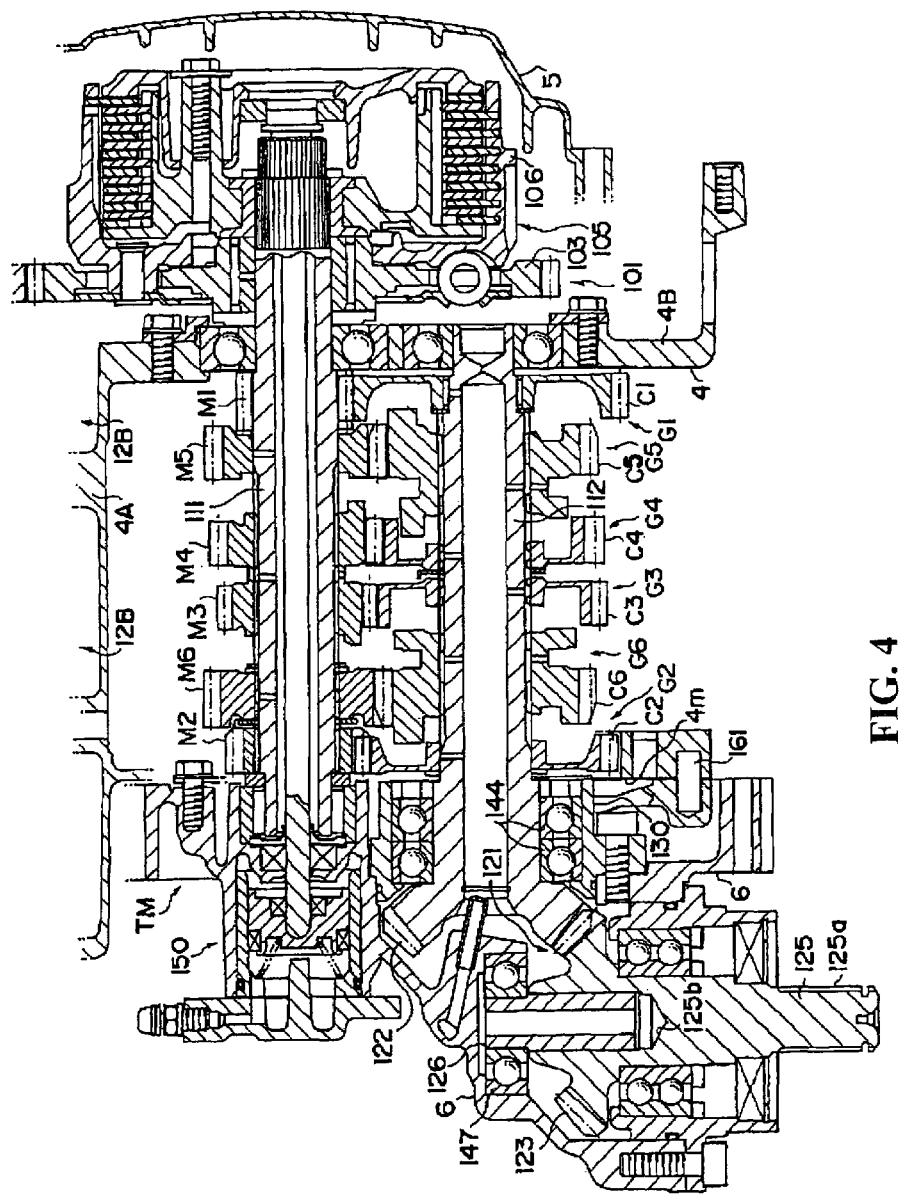
FIG. 4 is a sectional view, as seen from the rear, of a power transmission mechanism of the power unit.
Figure 7:
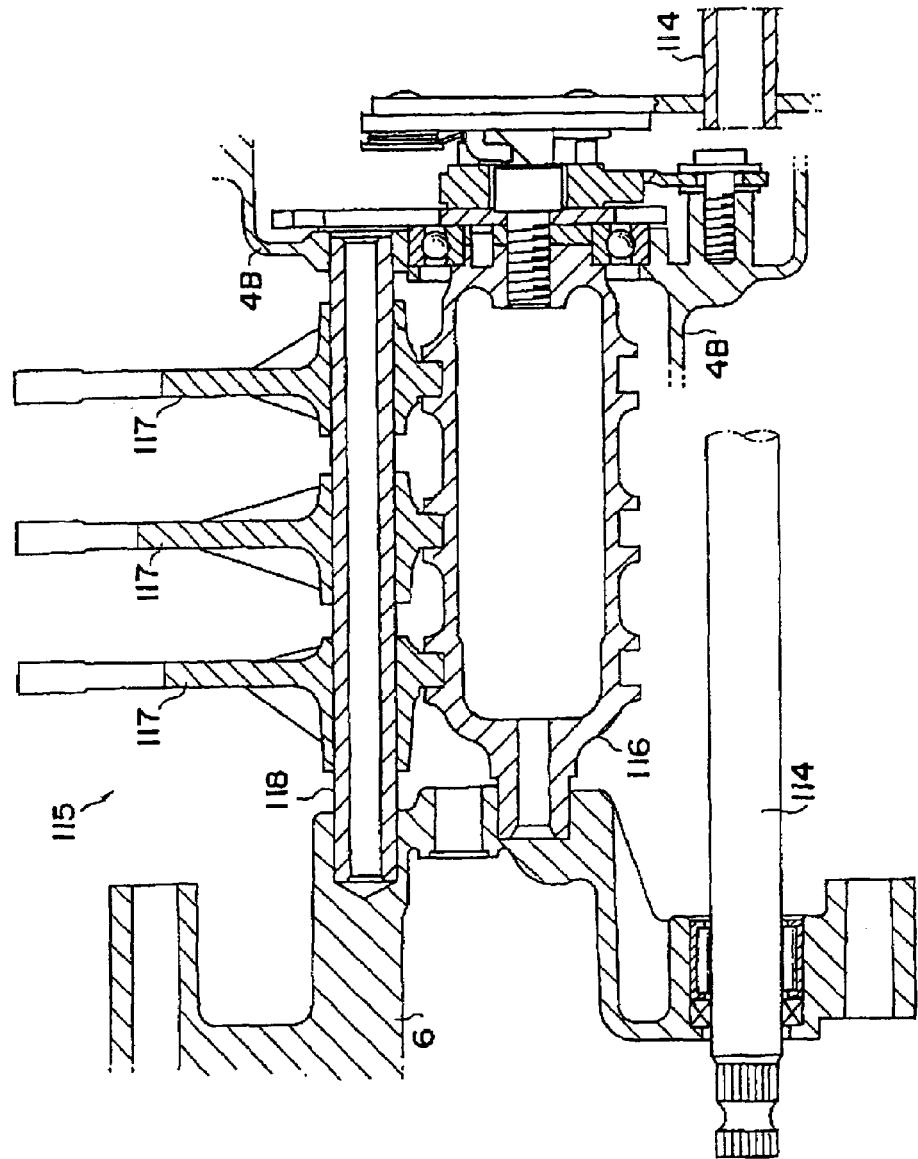
FIG. 7 is a sectional view of a shift drum mechanism.

Next, the power transmission mechanism TM will be described. As shown in FIGS. 4 and 7, the power transmission mechanism TM is composed of a primary gear train 101, a multiple disc clutch 105, a transmission mechanism 110, a bevel gear train 121, and a propeller shaft mounting member 125, and is accommodated inside the transmission case portion 4B of the lower case 4 and the bevel gear case 6. The bevel gear case 6 is coupled to the left side surface of the transmission case portion 4B of the lower case 4. Further, the transmission mechanism 110 includes a main shaft 111 and a counter shaft 112 extending laterally in parallel to the crankshaft 12 and disposed so as to be rotatable.

The primary gear train 101 is composed of a primary drive gear 102 that rotates integrally with the crankshaft 12, and a primary driven gear 103 provided so as to be rotatable on the main shaft 111. The primary driven gear 103 has a large diameter, so that the rotation of the crankshaft 12 is reduced in speed at a large reduction ratio before being transmitted to the primary driven gear 103.

As shown in FIG. 2, the primary drive gear 102 is the same gear as the cam drive gear 31 of the cam drive mechanism 30. The cam drive gear 31 is used as a gear common to the cam drive mechanism 30 and the power transmission mechanism TM, whereby the number of mounting parts with respect to the crankshaft 12 is reduced to thereby achieve a reduction in the axial size of the crankshaft 12. The primary driven gear 103 rotates integrally with an outer clutch 106 of the multiple disc clutch 105 mounted to the main shaft 111. The multiple disc clutch 105 is mounted to the right end portion of the main shaft 111, and brings an outer plate 108, which is provided to the outer clutch 106, and an inner plate 109, which is provided to an inner clutch 107 that rotates integrally with the main shaft 111, into engagement with or disengagement from each other in accordance with the actuation of a release mechanism 150, thereby transmitting the rotation of the primary gear train 101 to the main shaft 111 in a manner allowing intermittent operation.

The transmission mechanism 110 is composed of the main shaft 111 disposed to the rear of and slightly below the crankshaft 112, the counter shaft 112 is disposed below the main shaft 111. Six transmission gear trains G1 to G6 are provided to the main shaft 111 and the counter shaft 112, and a shift drum mechanism 113 for shifting transmission gears. In the transmission gear trains G1 to G6, corresponding ones of drive transmission gears M1 to M6 provided to the main shaft 111 and driven transmission gears C1 to C6 provided to the counter shaft 112 are always in meshing engagement with each other, and only one of the transmission gear trains is rotated integrally with the main shaft 111 and the counter shaft 112.

As shown in FIG. 7, the shift drum mechanism 113 includes a shift spindle 114 that rotates in accordance with pedal operation on a shift pedal (not shown), a shift drum 116 that rotates in accordance with the rotation of the shift spindle 114, shift forks 117 that engage with grooves formed in the outer peripheral surface of the shift drum 116 and moves in the axial direction of the shift drum 116 in accordance with the rotation of the shift drum 116. A fork shaft 118 is provided that guides the movement of the shift forks 117. A predetermined gear pair from among the drive and driven gears is moved in the axial direction through the movement of the shift forks 117, thereby changing the one of the transmission gear trains G1 to G6 that is to rotate integrally with the main shaft 111 and the counter shaft 112.

The bevel gear train 121 includes a bevel drive gear 122 formed integrally at the distal end of the counter shaft 112, and a bevel driven gear 123 formed integrally at one end portion of the shaft mounting member 125. The shaft mounting member 125 has a fixing hole 125b formed in an end face at one end portion, and a spline 125a formed at the other end portion. A support shaft 126 is mounted in the fixing hole 125b. The support shaft 126 is rotatably supported by a bearing 146 provided in the interior of the bevel gear case 6. A shaft main body that extends toward the rear wheel is mounted to the spline 125a. The shaft main body and the shaft mounting member 125 constitute a propeller shaft. The rotational output of the counter shaft 112 is transmitted to the rear wheel by the propeller shaft. The shaft mounting member 125 is mounted to the bevel gear case 6 in advance. Further, bearings 144, which support the left end portion of the counter shaft 112 in which the bevel drive gear 122 is formed, are held by a bearing holder 130. The bearing holder 130 is mounted to the bevel gear case 6 in advance, and the bevel gear train 121 is accommodated in the bevel gear case 6 in an intermeshed state in advance.

Further, the left end portion of the main shaft 111 is supported on the bevel gear case 6, so the main shaft 111 is assembled onto the bevel gear case 6 in advance with the transmission gear trains G1 to G6 being in meshing engagement. Further, the left end portions of the shift spindle 114, shift drum 116, and fork shaft 118 are also supported on the bevel gear case 6 in advance.

In this embodiment, the main shaft 111, the counter shaft 112, the transmission gear trains G1 to G6, the shift drum mechanism 113, the bevel gear train 121, the propeller shaft mounting member 125, the bearing holder 130, and the release mechanism 150 are assembled onto the bevel gear case 6 in advance. By mounting the bevel gear case 6 as described above so as to cover the lower case 4, the components of the power transmission mechanism TM are accommodated in the interior space of the transmission case portion 4B. At this time, the right end portions of the main shaft 111, counter shaft 112, shift spindle 116, shift drum 117, and fork shaft 119 are supported onto the lower case 4. Thereafter, the primary driven gear 103 and the multiple disc clutch 105 are mounted from the right end portion of the main shaft 111, and the side cover 5 is coupled so as to cover the right side surface of the lower case 4.

As described above, the bevel gear case 6 is coupled to the lower case 4 with the components of the power transmission mechanism TM being previously assembled onto the bevel gear case 6. This ensures greater ease of assembly of the transmission gear trains G1 to G6 and bevel gear train 120, and allows the power transmission mechanism TM to be easily accommodated into the unit housing H for assembly.

In the power unit PU according to this embodiment as described above, the joining surface 12C between the cylinder block 3 and the lower case 4 that form the crankcase 12A extends substantially vertically as seen in a side view, the center axis 12d of the crankshaft 12 is located on the joining surface 12C, and the center axis 34a of the first idle shaft 34, which serves as the shaft common to the cam drive mechanism 20, the starter 50, and the balancer mechanism, are similarly located on the joining surface 12C and arranged below the crankshaft 12. The main shaft 111 is arranged in the upper rear of the interior space of the lower case 4, with the counter shaft 112 being arranged below the main shaft 111.

It should be noted that in the primary gear train 101, the primary driven gear 103 has a large diameter so that the rotation of the crankshaft 12 is reduced in speed at a large reduction ratio before being transmitted to the main shaft 111. Accordingly, the center distance between the crankshaft 12 and the main shaft 111 becomes long. A space is thus formed between the first idle shaft 34 arranged below the crankshaft 12 and the countershaft 112 arranged below the main shaft 111. The pump shaft 97 as the drive shaft of the oil pump and water pump 81 is arranged in this space.

Further, since the second idle shaft 35 is arranged in front of the first idle shaft 34 whose center axis 34d is located below the joining surface 12C, the cam drive sprocket 39 is located in the lower front, and the cam drive sprocket 39 side of the chain chamber 30a is offset downwardly. Due to this offset, a dead space is formed above the cam drive sprocket 39 side of the chain chamber 30a, and the breather chamber 46 is formed in this space. Accordingly, the space is effectively used to achieve a reduction in the size of the power unit PU. At this time, there is no need to form the breather chamber 46 in the interior of the head cover 1 as conventionally required, whereby the volume of the head cover 1 can be reduced. When, in particular, the power unit PU is disposed in the vehicle with the cylinder axis 11A being tilted forward, the size of the power unit PU is reduced with respect to the longitudinal direction, thereby allowing a greater freedom of mounting onto the vehicle.

As shown in FIGS. 8 to 10, as described above, in the portion below the cylinder head 2 of such a power unit PU, the U-shaped exhaust manifolds 27 extend from each combustion chamber 9. The piping structure of the respective exhaust manifolds 27 is such that they merge at the ends, with a muffler (not shown) being mounted on the downstream side. Further, the radiator 86 constituting the cooling device is mounted below the head cover 1, that is, in front of the exhaust manifolds 27.

In the power unit PU, the cylinder portion 3A of the cylinder block 3 is larger in volume than the cylinder head 2. The cylinder head 2 is arranged in front of the portion straddled by the feet of the rider. Accordingly, the housing of the engine E is provided in the space sandwiched between the respective pairs of left and right upper members 202 and down members 203. In addition, the head cover 1, the cylinder head 2, and the cylinder block 3 are each arranged in proximity to the left and right upper members 202 and down members 203. Accordingly, the engine E is mounted in the motorcycle MC in such a manner than the front end portions of the upper members 202 and down members 203 are covered by the head cover 1.

According to the scooter type vehicle of this embodiment constructed as described above, as seen in side view, the center axis 12d of the crankshaft 12 is arranged above the step floors 215. Since the crankshaft 12 is thus arranged at a position higher than the step floors 215, the center of gravity of the engine E can be made higher than those in related arrangements. The higher center of gravity of the vehicle allows adaptation to a wide variety of concepts.

Further, the crankshaft 12 and also the operating portion of the engine E, such as the piston 11 and the connecting rod 13, are arranged above the left and right step floors 215. As compared with related arrangements, the operating portion is arranged at substantially the same height as the step floors 215. The step floors 215 and the operating portion of the engine E are spaced further away from each other, so vibration accompanying the operation of the engine E is not easily transmitted to the step floors 215. The vibration transmitted to the feet is thus reduced to provide improved comfort.

Further, the three cylinder bores 3a to 3c are provided in the cylinder block 3, and the cylinder block 3 is arranged in the space sandwiched between the pair of left and right upper members 202. Accordingly, the required cylinder capacity of the engine E is distributed among three cylinders, thereby achieving an improvement in quietness and dynamic performance. Further, the cylinder head 2 and the head cover 1, which are increasingly becoming larger in volume, are arranged on the front side in the interior of the intermediate cover member 222. Accordingly, the cylinder block 3 is located at the portion that is subject to limitations due to the foot breadth, and the cylinder head 2 is disposed in front of that portion. Therefore, the cylinder block 3 having the three cylinder bores 3a to 3c can be arranged with the three-cylinder engine being located in proximity to the left and right upper members 202.

Further, the center axis 12d of the crankshaft 12 is disposed at a high position. Although the cylinder axis 11A is tilted forward to extend substantially horizontally, it is oriented upwardly as it extends forwardly. Further, the engine E is of the offset crank type, so that as seen in side view, the cylinder axis 11A passes through a portion above the center axis 12d of the crankshaft 12.

Since the center axis 12d of the crankshaft 12 is arranged at a higher position as compared with the related art, a predetermined dead space is formed below the crankshaft 12. Here, in the power unit PU of this embodiment, the integral unit housing H includes the cylinder block 3 and the lower case 4 with the main shaft 111 and counter shaft 112 of the power transmission mechanism being arranged in the interior of the lower case 4, the main shaft 111 being arranged in rear of the crankshaft 12, and the counter shaft 112 being arranged below the main shaft 111. Due to this shaft arrangement, the space formed by arranging the crankshaft 12 at a high position can be effectively used, and the size of the power transmission mechanism TM can be reduced with respect to the longitudinal direction. Further, although the arrangement of the crankshaft 12 at a higher position results in a larger elevation difference between the crankshaft 12 and the rear wheel than in the related art, such elevational difference is overcome through vertical arrangement of the main shaft 111 and counter shaft 112. Extraction of power from the counter shaft 112 to the rear wheel can be thus performed without difficulty by reducing the elevation difference.

Further, the reduced size of the power transmission mechanism TM as described above makes it possible to arrange the rear-wheel rocking pivot shaft 213, which supports the front end portion of the rear fork 209, more frontward than in the related art. Accordingly, the rear fork 209 can be increased in length when disposing the power unit PU in the vehicle, whereby the rocking actuation (rocking angle) of the rear fork 209 when the vehicle operates on an uneven road surface can be made smaller. Therefore, the rocking of the vehicle body in the longitudinal (vertical) direction during operation on an uneven road surface can be reduced, thereby achieving enhanced comfort.

In the power unit PU of this embodiment, the exhaust passage 25 communicating with the combustion chamber 9 is formed so as to extend downwardly, with the exhaust connection port 26 being downwardly open. Further, the exhaust manifolds 27, provided so as to extend downward from the exhaust connection port 26 of the cylinder head 2, are disposed in the space thus newly formed. In this way, the U-shaped exhaust manifolds 27 can be accommodated compactly while securing a large routing space for the exhaust manifolds 27, whereby it is possible to achieve enhanced performance of the power unit PU in addition to efficient exhaust. It should be noted that since the cylinder axis 11A is offset upwardly with respect to the center axis 12d of the crankshaft 12, a large space can be secured below the cylinder head 2, thereby making it possible to secure a large routing space for the exhaust manifolds 27.

Further, the head cover 1 is joined in front of the cylinder head 2. The head cover 1 is disposed so as to cover the space sandwiched between the upper members 202 and the down members 203. It should be noted that as in the case of the cylinder head 2, a space is formed below the head cover 1. In the motorcycle MC of this embodiment, the radiator 86 constituting the cooling device is disposed in this space. During the operation of the motorcycle MC constructed as described above, an airflow W from a forward direction is introduced into the intermediate cover member 222 and reaches the front end portions of the upper members 202 and down members 203. The airflow W that has reached the front end portions into the space surrounded by the upper members 202 is blocked by the head cover 1 arranged so as to cover the front end portions, whereby as illustrated in the drawing, the airflow W can be caused to flow to the radiator 86 side located below. Accordingly, an improvement is achieved in terms of the cooling efficiency of the cooling water by the radiator 86. The space is effectively utilized to achieve a reduction in the size of the engine E. As for the cooling water pump, in the interior of the lower case 4, the water pump 81 is mounted to the pump shaft 97 arranged in proximity to the oil sump 8 forming the lower end of the unit housing H. In this way, the piping structure for connecting between the water pump 81 and the radiator 86, which are both located in a lower part of the power unit PU, can be made compact.

It should be noted that the exhaust manifolds 27 are disposed to the rear of the radiator 86 as described above. Accordingly, the airflow W blown onto the radiator 86 can be efficiently introduced to the exhaust manifolds 27, whereby the exhaust manifolds 27 can be cooled efficiently. It should be noted that the temperature of the airflow that has been heated as it passes through the radiator 86 is sufficiently lower than the temperature of the exhaust manifolds 27.

With the breather structure 45 of this embodiment as described above, the breather chamber 46 is formed by utilizing the space above the chain chamber 30a that is offset downwardly. Accordingly, unlike related arrangements, there is no need to form the breather chamber 46 within the head cover 1, thereby making it possible to reduce the volume of the head cover 1. It should be noted that when the engine E is disposed in a motorcycle with the cylinder axis 11A being tilted forward as in this embodiment, the size of the engine E can be reduced with respect to the longitudinal direction, thereby making it possible to increase the overall freedom of design of a motorcycle.

Further, the pipe connecting member is provided so as to project upwardly from the breather chamber 46. Since the intake system is mounted to the external connection port 23 of the intake passage 22 that is upwardly open, the piping structure for connecting the breather chamber 46 and the intake system can be made compact. Further, according to the breather structure 45, the blowby gas is caused to flow into the breather passage 247 and the breather chamber 46 by utilizing the pulsation of the crank chamber 12B. In this regard, the breather chamber 46 is formed on the right of the cylinder bore 3c and located close to the crank chamber 12B as compared with the arrangement in which the breather chamber 46 is formed within the head cover 1. Accordingly, the breather passage 247 and the breather chamber 46 are susceptible to the influence of pulsation of the crank chamber 12B, thereby achieving an improvement in the exhaust efficiency of the blowby gas.

Further, the idle shaft 32 is composed of the first and second idle shafts 34, 35, and the second idle shaft 35 provided with the cam drive sprocket 39 is located below and in front of the crankshaft 12. Accordingly, the downward offset on the cam drive sprocket side of the chain chamber 30a came be made large, thereby making it possible to secure a larger space above the chain chamber 30a for forming the breather chamber 46. Further, due to the idle gear train 33, the rotation of the crankshaft 12 is transmitted to the cam drive sprocket 39 after being reduced in speed. According to the structure as described above in which speed reduction is achieved not by the sprockets 39 to 41 but by the idle gear train 33, the diameter of the cam drive sprocket 39 is reduced, thereby making it possible to reduce the surface area of the region surrounded by the cam chain 42 suspended between the sprockets 39 to 41. This allows a reduction in the volume of the chain chamber 30a, thereby making it possible to secure a large space for forming the breather chamber 46. The thus enlarged space for the breather chamber 46 enables an improvement in the exhaust efficiency of the blowby gas.

Further, with the starter 50 of this embodiment, the starter gear train 54, which constitutes the speed reducing gear train 52 for transmitting the driving force of the starter motor 51 to the crankshaft 12, is provided to the first and second idle shafts 34, 35 constituting the cam drive mechanism 30. Accordingly, the starter 50 can be constructed while omitting a dedicated shaft for providing the starter gear train 54 thereon, whereby the number of parts of the starter 50 is reduced and a dedicated arrangement space is omitted to thereby achieve a reduction in the size of the engine E.

Further, the one-way clutch 58 is provided to the first idle shaft 34 constituting the cam drive mechanism 30, and is adapted to transmit the rotation of the starter driven gear 57 to the crankshaft 12 via the cam drive gear 31 and first idle gear 36 of the cam drive mechanism 30. While in a related engine arrangements the one-way clutch 58 is often built in the flywheel magnet 99 provided to the crankshaft 12, as compared with such arrangements, the size of the flywheel magnet 99 can be reduced with respect to the axial direction, thereby making it possible to reduce the size of the crankshaft 12 with respect to the axial direction.

Further, the first idle gear 36 constituting the cam drive mechanism 30 is provided with the thick-walled portion 36a, which functions as a balancer weight, and the weight member 36b, and the components of the balancer mechanism and the components of the cam drive mechanism 30 are made common to each other, with the first idle shaft 34 constituting the cam drive mechanism 30 functioning as a balancer shaft according to the present invention. This makes it possible to omit a dedicated shaft constituting a balancer mechanism, whereby the number of parts is reduced to achieve a reduction in the size of the engine E. As described above, the first idle shaft 34 is used as a shaft common to the cam drive mechanism 30, the starter 50, and the balancer mechanism, whereby a plurality of dedicated shafts for the respective mechanisms can be omitted to thereby achieve a further reduction in the size of the engine E.

Further, as illustrated in FIG. 5, the rotation pulsar 91 for the crankshaft 12 is mounted to the first idle shaft 34 that rotates at the same rotational speed as the crankshaft 12. The number of parts mounted to the crankshaft can be thus reduced to achieve a reduction in the size of the crankshaft with respect to the axial direction.

Further, as shown in FIG. 5, the second idle shaft 35 has the third idle gear 38 and the cam drive sprocket 39 provided at a central portion 35c, and the starter drive gear 55 provided at the left end portion 35b; a projecting portion 94 is formed in the end face of the right end portion 35a, and an adjuster hole 94a as a hexagonal hole is formed on an axis 35A of the right end portion 35a. With the mounting members 38, 39, 55 mentioned above mounted on the second idle shaft 35, the left end portion 35b of the second idle shaft 35 is supported on the lower case 3b, and when attaching the side cover thereafter, the right end portion 35b thereof is retained by the retention hole 5a. With the second idle shaft 35 being retained in the retention hole 5a, the adjuster hole 94a is exposed on the outer side of the side cover 5. It should be noted that the portion of the side cover 5 in the periphery of the retention hole 5a is offset inward so that the projecting portion 94 does not project beyond the outer edge of the side cover 5.

As indicated by the chain line in FIG. 5, an axis 35C of the central portion 35c of the second idle shaft 35 is eccentric with respect to the axis 35A of the right and left end portions 35a, 35b. Accordingly, when the second idle shaft 35 is rotated using the hexagonal adjuster hole 94a, the entire second idle shaft 35 can be rotated about the axis of the right and left end portions 35a, 35b. That is, since the central portion 35c of the second idle shaft 35 rotates eccentrically, the third idle gear 38 rotates eccentrically, thereby allowing easy adjustment of the backlash of the second idle gear 37 and third idle gear 38.

After performing the backlash adjustment, an idle shaft fixing plate 95 having a screw hole formed at the central portion thereof is attached from the outside of the side cover 5. A thread is formed in the outer peripheral surface of the projecting portion 94. Using the screw hole at the central portion thereof, the idle shaft fixing plate 95 is brought into threaded engagement with the projecting portion 94, whereby the second idle shaft 35 is fixed with respect to the idle shaft fixing plate 95. Further, an arcuate elongated hole is formed in the idle shaft fixing plate 95. A bolt is inserted from this elongated hole into a screw hole 5b formed in the periphery of the retention hole of the side cover 5, whereby the idle shaft fixing plate 95 is fixed with respect to the side cover 5. The second idle shaft 35 thus functions as a stationary shaft.

Further, as shown in FIG. 5, the third idle gear 38 has a projection 38a provided at the outer peripheral edge portion of the left side surface. As shown in FIG. 2, the third idle gear 38 has a large diameter in order to reduce the speed of the rotation of the second idle gear 37, and is larger in diameter than the cam drive sprocket 39 and the starter drive gear 55 that are located coaxially with the third idle gear 37. For this reason, while the third idle gear 38 is mounted on the right side with respect to the cam drive sprocket 39 and the starter drive gear 55, as seen in left side view, the outer peripheral edge portion of the third idle gear 38 is partially exposed downwardly. The projection 38a passes through this downwardly exposed portion in accordance with the rotation of the third idle gear 38.

Figure 16:
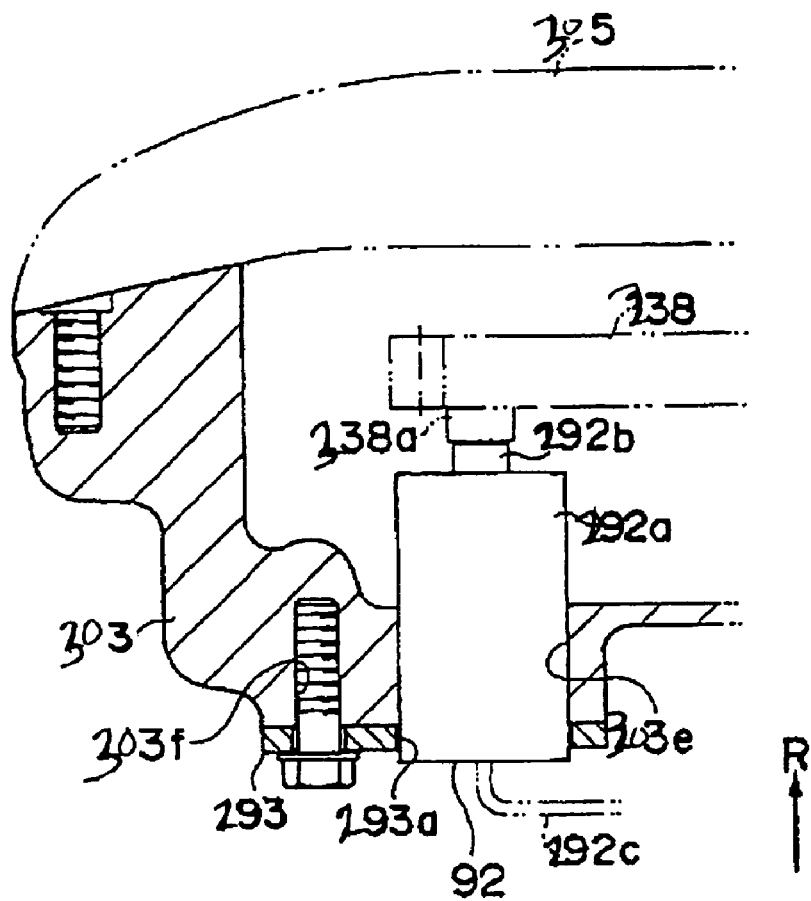
FIG. 16 is a sectional view of the cylinder block, illustrating the assembly state of a pulse sensor.

As shown in FIGS. 5 and 16, a pulse sensor 92 is provided so as to face the projection 38a The pulse sensor 92 is a non-contact type sensor composed of a main body housing portion 292a having a circular cylindrical shape, and a detection portion 292b protruding from the main body housing portion 292a. An ON signal is output as the protrusion passes through the detection portion 292b. A cable 292c is connected to the detection portion 292b and extends to the outside from the main body housing portion 292a and is connected to a controller (not shown) for electrically controlling the operations of various devices.

As shown in FIGS. 5, 6 and 16, in the left side surface of the cylinder block 3, a sensor mounting hole 3e is formed at a portion offset to the right side in the same manner as the motor mounting hole 3d so as to extend through the left side surface. The pulse sensor 92 is previously press-fitted into a circular hole 293a formed in a flat-shaped sensor fixing member 293, and then mounted by bringing the main body housing portion 292a into fitting engagement with the sensor mounting hole 303e so as to insert the detection portion 92b into the cylinder block 303. Further, by inserting a bolt from outside into a bolt insertion hole 303f formed in proximity to the sensor mounting hole 303e, the sensor fixing member 293 is fixed to the left side surface of the cylinder block 303.

The main body housing portion 292a of the pulse sensor 92 thus mounted is located below the cam drive sprocket 39 and the starter drive gear 55, and the detection portion 292b is located on the trajectory of rotation of the protrusion 38a while being opposed to the downwardly exposed portion of the left side surface of the third idle gear 38. When the third idle gear 38 rotates and the projection 38a passes through the detection portion 292b, the ON signal from the pulse sensor 92 is input to the controller. The third idle gear 38 makes one rotation as the piston 11 makes two reciprocating motions and the crankshaft 12 makes two rotations. The controller determines, on the basis of the signal from the pulse sensor 92, the timing at which the piston 11 is located in the compression top dead center position, and performs control for activating various devices such as an ignition plug at predetermined optimum timings on the basis of the determined timing.

As described above, at the mounting position of the second idle shaft 35, the left side surface of the cylinder block 3 is largely offset to the right side, so the lateral width of the interior space of the cylinder block 3 becomes small. Further, the third idle gear 38 is set to a larger diameter, with its side surface being partially exposed downwardly as seen in left side view. Accordingly, in the arrangement of this embodiment in which the right side surface of the cylinder block 3 is open, by mounting the pulse sensor 92 from outside the left side surface of the cylinder block 3 with respect to the third idle gear 38 located on the right side on the second idle shaft 35, the detection portion 292b can be positioned on the trajectory of rotation of the projection 38a provided to the left side surface of the third idle gear 35, whereby the pulse sensor 92 can be easily mounted.

Figure 18:
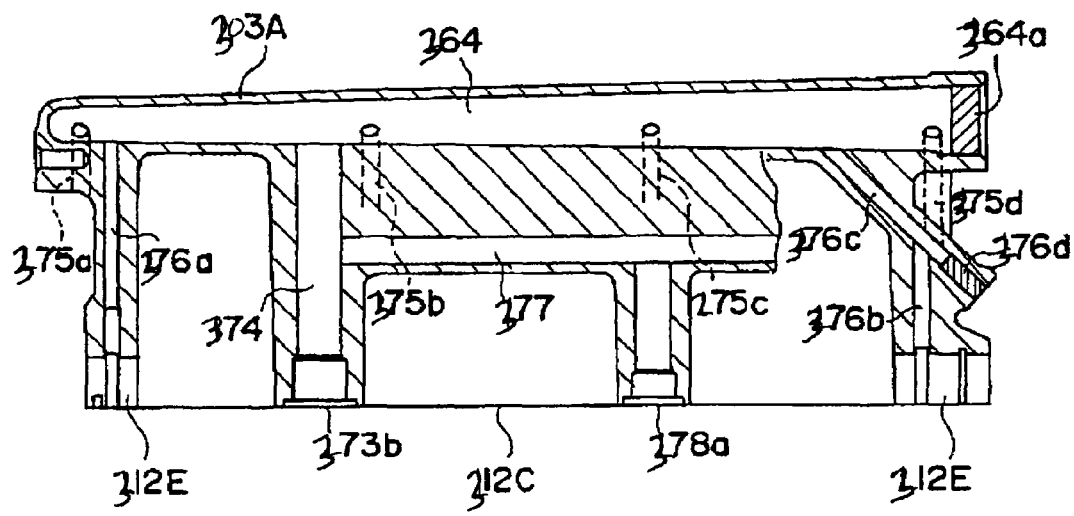
FIG. 18 is a front sectional view of the cylinder block, illustrating the main gallery and journal supply oil passages.

As shown in FIG. 17, an oil sump 308 is mounted from below to a lower part of the lower case. The interior space of the oil sump 308 communicates with the interior space of the lower case. Lubricating oil for the engine E and power transmission mechanism TM is stored in the oil sump 308. As shown in FIGS. 17 and 18, a lubricating device for supplying the lubricating oil to each lubricating portion is composed of an oil pump 361, a strainer 362, a relief valve 363, an oil cooler 364, and an oil filter (not shown). Oil passages are provided for connecting these components to each other or with the lubricating portions.

As shown in FIGS. 2 and 17, a pump shaft 97 is rotatably disposed so as to extend laterally while being located in a lower part of the interior space of the lower crankcase portion 304A of the lower case 4, that is, in rear of the first idle shaft 34. The pump shaft 97 is driven as the rotation of the first idle shaft 34 is transmitted to the pump shaft 97 by a pump drive mechanism 98. As shown in FIG. 2, the pump drive mechanism 98 is composed of a pump drive sprocket 98a formed integrally with the first idle shaft 34, a pump driven sprocket 98b provided to the pump shaft 97 and rotating integrally with the pump shaft 97, and a pump chain 98c suspended between both the sprockets 98a, 98b.

The oil pump 361 is of a trochoid type and mounted to the left end portion of the pump shaft 97, and is driven as the pump shaft 97 rotates. The oil pump 361 has an intake pipe connecting portion 361a and a discharge oil passage connecting portion 361b that are integrally formed therewith, and one end of an intake pipe 366 is connected to the intake pipe connecting portion 361a. The strainer 362 is mounted to the other end of the intake pipe 366. The strainer 362 is placed on circumferential ribs 308a of a large diameter formed so as to project upwardly from the lower inner wall surface of the oil sump 308. The discharge oil passage connecting portion 361b is connected to a pump discharge oil passage 367 formed in the interior of the lower case 4. As shown in FIGS. 13 and 17, the pump discharge oil passage 367 is connected to an inlet opening 368a of a cooler mounting portion 368 formed integrally with the outer surface of the lower case.

With the lubricating device as described above, when the piston 11 is actuated and the first idle shaft 34 rotates, and the pump shaft 97 is rotated via the pump drive mechanism 98, the oil pump 361 is driven. When the oil pump 361 is driven, the lubricating oil stored in the oil sump 308 is sucked in from the strainer 362 and introduced to the intake pipe 366. After being introduced to the intake pipe 36 and flowing from the intake pipe connecting portion 361a into the oil pump 361, the lubricating oil is pumped from the discharge oil passage connecting portion 361b to the pump discharge oil passage 367 and introduced to the inlet opening 368a of the cooler mounting portion 368.

The inlet opening 368a, an outlet opening 368b, and a relief opening 368c are formed in the cooler mounting portion 368. An oil cooler 364 is externally mounted to the cooler mounting portion 368. The oil cooler 364 has an intake port and a discharge port and is adapted to cool the lubricating oil flowing in from the intake port before introducing it to the discharge port. The discharge port is communicated with the outlet opening 368b of the cooler mounting portion 368. The relief opening 368c is connected to the relief valve 363 via a relief passage 369 formed in the interior of the lower case 304. The relief valve 363 is placed on circumferential ribs 308b of a small diameter formed so as to project upwardly from the lower inner wall surface of the oil sump 308. When a predetermined oil pressure regulated by the urging force of a built-in valve spring 363a is exceeded, the relief valve 363 opens to recirculate the lubricating oil introduced to the inlet opening 368a back to the oil sump 308, thereby adjusting the pressure of the lubricating oil introduced to the main gallery 365 and the like.

A cooler discharge oil passage 370 extends through the interior of the lower case 4 from the outlet opening 368b. As shown in FIG. 13, the cooler discharge oil passage 370 is connected to an inlet opening 371a of a filter mounting portion 371 located on the right of the cooler mounting portion 368 and formed integrally with the lower case 304 in the outer surface of the lower case 304. The filter mounting portion 371 has the inlet opening 371a and an outlet opening 371b, with an oil filter being externally mounted thereto. An intake port and a discharge port are formed in the oil filter so that oil flowing in from the intake port is filtered by a built-in filter element before being introduced to the discharge port. The intake port of the oil filter is in communication with the inlet opening 371a of the filter mounting portion 371, and the discharge port thereof is communicated with the outlet opening 371b of the filter mounting portion 371. As shown in FIG. 6, the outlet opening 71b of the filter mounting portion is connected to a lower outflow oil hole 373a that opens in the joining surface of the lower case 4 via a filter discharge oil passage 72 formed in the interior of the lower case 4.

As shown in FIG. 12, a cylinder inflow oil hole 373b, which is brought into alignment with the lower outflow oil hole 373a upon coupling the cylinder block 303 to the lower case, is formed in the joining surface of the cylinder block 303. As shown in FIG. 18, an inflow oil passage 374 is formed in the interior of the cylinder block 303 so as to extend upwardly forward from the cylinder inflow oil hole 373b.

The inflow oil passage 374 is communicated with the main gallery 365 formed so as to extent laterally in the interior of the cylinder block 303. Here, as shown in FIG. 6, in the engine E according to this embodiment, the cylinder axis 11A extending substantially longitudinally does not cross the center axis 12d of the crankshaft 12 that extends laterally, and the cylinder bores 3a to 3c are formed with the cylinder axis 11A being offset upwardly with respect to the center axis 12d of the crankshaft 12. The main gallery 65 is formed so as to be located opposite (below) the cylinder axis 11A with respect to the center axis 12d of the crankshaft 12. It should be noted that the main gallery 65 is formed by drilling from the left side surface of the cylinder block 3 and communicates with the inflow oil passage 75, with an oil cap 65a being attached over the opening in the left side surface to form a closed oil passage.

As shown in FIG. 18, the main gallery 365 is communicated with four crank journal supply oil passages 375a to 375d respectively provided in correspondence with the four crank journal portions 312D. As shown in FIG. 6, the crank journal supply oil passages 75a to 75d are formed so as to extend linearly in the interior of the cylinder portion 3A of the cylinder block 3 and by the side of the cylinder bores 3a to 3c from the main gallery 65 toward the corresponding crank journal portions 12D, without penetrating through the cylinder bores 3a to 3c.

Further, as shown in FIGS. 6 and 18, two idle journal supply oil passages 376a, 376b respectively provided in correspondence with the two idle journal portions 12E extend from the main gallery 65 so as to communicate with the idle journal portions 12E. Of the idle journal supply oil passages 376a, 376b the oil passage 376a connected to the idle journal portion 12E on the right side is formed so as to extend linearly. On the other hand, the oil passage 376b connected to the idle journal portion 12E on the left side is communicated with the main gallery 65 via a tilted oil passage 376c formed on the right side of the main gallery 65 and extending in a tilted fashion toward the left end portion. It should be noted that the tilted oil passage 376c is formed by drilling from the outer surface of the cylinder block 3 and is in communication with the main gallery 65 and the idle journal supply oil passage 376b, with an oil cap 376d being attached from the outside to form a closed oil passage.

As illustrated in FIG. 3, the lubricating oil supplied to the crank journal portion 12D is introduced to a journal oil hole 12e radially extending through the journal 12a of the crankshaft 12. The oil hole 12e is communicated with a crank oil passage 12f extending in the interior of the crankshaft 12a toward the center of the crank pin 12c. Further, the crank pin 12c is also provided with a pin oil hole 12g that radially extends through the crank pin 12c. The lubrication between the connecting rod 13 and the crank pin 12c is performed by the lubricating oil thus introduced to the journal oil hole 12e, the crank oil passage 12f, and the pin oil hole 12g. Further, an outwardly opening oil hole (not shown) is formed in the connecting rod 13. Lubricating oil is supplied from this oil hole into the cylinder bores 3a to 3c for lubrication between the piston 11 and the cylinder block 3.

As illustrated in FIG. 18, a branching oil passage 377 extending substantially in parallel to the main gallery is in communication with the inflow oil passage 374 at a portion between the communicating portions of the inflow oil passage 374 with the cylinder inflow oil hole 373b and with the main gallery. The branching oil passage 377 is bent toward the joining surface 312C again and is connected to a cylinder outflow oil hole 378a formed in the joining surface on the cylinder block side. The joining surface on the lower case side is provided with a lower inflow oil hole 378b that is brought into alignment with the cylinder outflow oil hole 378a upon coupling with the cylinder block. The lower inflow oil hole 378b is connected to a lubricating oil inflow oil passage formed in the bevel gear case via a transmission supply oil passage extending rearward in the interior of the lower case, and connected to the respective lubricating portions of the power transmitting mechanism TM.

Further, as shown in FIG. 6, the cooling device of the engine E of this embodiment is composed of a water pump 81 for pumping cooling water, a radiator (not shown) for cooling the cooling water, and a thermostat (not shown) for adjusting the temperature of the cooling water. Respective pipes and passages are provided for connection between the respective devices or with a water jacket 83 formed so as to surround the periphery of the cylinder bores 3a to 3c.

The water pump 81 includes a casing member having three pipe connecting portions consisting of a discharge pipe connecting portion 81a, a radiator pipe connecting portion 81b, and a bypass pipe connecting portion 81c that are integrally formed with the casing member. The water pump 81 is mounted to the right end portion of the pump shaft 97. An impeller (not shown), that rotates integrally with the pump shaft 97, is mounted in the interior of the casing. When the impeller rotates as the pump shaft 97 rotates, the cooling water sucked into the casing from the radiator pipe connecting portion 81b or the bypass pipe connecting portion 81c is pumped to the outside from the discharge pipe connecting portion 81a.

As illustrated in FIGS. 1 and 6, a discharge pipe (not shown) is connected to the discharge pipe connecting portion 81a. The discharge pipe extends outside the housing from an extraction opening formed in the side cover, and is connected to a pipe connecting portion 84 attached to the cylinder portion 3A of the cylinder block 3 as shown in FIG. 1. The pipe connecting portion 84 is in communication with a cooling water passage 85 formed in the interior of the cylinder block 3, and is further in communication with the water jacket 83 via the cooling water passage 85.

The engine E is cooled as the cooling water discharged from the water pump 81 flows into the water jacket 83. The cooling water whose temperature has increased due to heat exchange during its passage through the water jacket 83 is introduced to the radiator via a pipe (not shown) and cooled. It should be noted that a thermostat is interposed in the pipe for introducing the cooling water from the water jacket 83 to the radiator, and there is provided a bypass passage (not shown) that connects between the thermostat and the bypass pipe connecting potion 81c of the water pump 81. When the temperature of the cooling water passing through the thermostat is equal to or lower than a predetermined temperature, the cooling water from the water jacket 83 is introduced to the bypass pipe without passing through the radiator and recirculated back to the water pump 81.

As described above, according to the lubricating device of this embodiment, as shown in FIGS. 1, 6, and 18, the main gallery 65 is formed so as to extend laterally below the cylinder bores 3a to 3c and is provided at a position in proximity to the crank journal portion 12D. Further, in the engine E of this embodiment, the cylinder axis 11A is offset upward with respect to the center axis 12d of the crank journal portion 12D, and the main gallery 65 is formed at the position opposite the cylinder axis 11A with respect to the center axis 12d of the crankshaft 12. Since the main gallery 65 is formed at a position in proximity to the crank journal portion 12D, the crank journal supply oil passages 375a to 376d can be formed so as to extend linearly toward the crank journal portion 12D without penetrating through the cylinder bores 3a to 3c, thereby making it possible to form the crank journal supply oil passages 375a to 375d compact.

Further, the crankshaft 12 and the first idle shaft 34 that functions as a balancer shaft are disposed on the joining surface 12C between the cylinder block 3 and the lower case 4 which is formed so as to extend substantially vertically as seen in a side view, whereby in the interior space of the lower case 4, a dead space is formed below the power transmission mechanism TM. By arranging various devices in this space, it is possible to make effective use of the dead space and achieve a reduction in the size of the engine E. Further, since this space is located in rear of the first idle shaft 34, when a device that is driven by transmitting the rotation of the crankshaft 12 to the device is disposed, the driving mechanism for transmitting rotation to this device can be constructed in a small size.

Further, the oil sump 8 for storing lubricating oil is mounted to a lower part of the lower case 4, and the dead space is located in proximity to the oil sump 8. Further, this space is located at substantially the central portion of the power unit PU with respect to the longitudinal direction, and is in proximity to the crankshaft 12 that is a particularly important lubricating portion of the power unit PU. Accordingly, the distance between the oil pump 61 and the strainer 62 is reduced to make the intake pipe 66 compact, whereby the oil passage structure from the oil pump 61 to the main gallery 65 can be made compact.

Further, according to the cooling device of this embodiment, the water pump 81 is mounted to the pump shaft 97 for driving the oil pump 61, and is driven through the rotation of the pump shaft 97. Since the drive shaft is shared with the oil pump 61 in this way, a dedicated drive shaft for the water pump 81, a dedicated transmission mechanism for transmitting driving force to the shaft, or the like can be omitted from the construction of the cooling device. This enables a reduction in the number of parts or a reduction in the size of the engine E.

Next, the power transmission mechanism TM will be described. As shown in FIGS. 4 and 7, the power transmission mechanism TM is composed of a primary gear train 101, a multiple disc clutch 105, a transmission mechanism 110, a bevel gear train 121, and a propeller shaft mounting member 125, and is accommodated inside the transmission case portion 4B of the lower case 4 and the bevel gear case 6. The bevel gear case 6 is coupled to the left side surface of the transmission case portion 4B of the lower case 4. Further, the transmission mechanism 110 includes a main shaft 111 and a counter shaft 112 extending laterally in parallel to the crankshaft 12 and disposed so as to be rotatable.

The primary gear train 101 is composed of a primary drive gear 102 that rotates integrally with the crankshaft 12, and a primary driven gear 103 provided so as to be rotatable on the main shaft 111. The primary driven gear 103 has a large diameter, so that the rotation of the crankshaft 12 is reduced in speed at a large reduction ratio before being transmitted to the primary driven gear 103.

As shown in FIGS. 2, 4 and 7, the primary drive gear 102 is the same gear as the cam drive gear 31 of the cam drive mechanism 30, so the cam drive gear 31 is used as a gear common to the cam drive mechanism 30 and the power transmission mechanism TM. The primary driven gear 103 rotates integrally with an outer clutch 106 of the multiple disc clutch 105 mounted to the main shaft 111. The multiple disc clutch 105 is mounted to the right end portion of the main shaft 111, and brings an outer plate, which is provided to the outer clutch 106, and an inner plate, which is provided to an inner clutch that rotates integrally with the main shaft 111, into engagement with or disengagement from each other in accordance with the actuation of a release mechanism, thereby transmitting the rotation of the primary gear train 101 to the main shaft 111 in a manner allowing intermittent operation.

The transmission mechanism 110 includes the main shaft 111 disposed in a rear of the crankshaft 12, the counter shaft 112 disposed below the main shaft 111, six transmission gear trains G1 to G6 provided to the main shaft 111 and the counter shaft 112, and a shift drum mechanism for shifting transmission gears. In the transmission gear trains G1 to G6, corresponding ones of drive transmission gears M1 to M6 provided to the main shaft 111 and driven transmission gears C1 to C6 provided to the counter shaft 112 are always in meshing engagement with each other, and only one of the transmission gear trains is rotated integrally with the main shaft 111 and the counter shaft 112.

As shown in FIG. 7, the shift drum mechanism is composed of a shift spindle 114 that rotates in accordance with pedal operation on a shift pedal (not shown), a shift drum 116 that rotates in accordance with the rotation of the shift spindle 114, shift forks 117 that engage with grooves formed in the outer peripheral surface of the shift drum 116 and move in the axial direction of the shift drum 116 in accordance with the rotation of the shift drum 116, and a fork shaft 118 that guides the movement of the shift forks 117. A predetermined gear pair from among the drive and driven gears is moved in the axial direction through the movement of the shift forks 117, thereby changing one of the transmission gear trains G1 to G6 that is to rotate integrally with the main shaft 111 and the counter shaft 112.

The bevel gear train 121 includes a bevel drive gear 122 formed integrally at the distal end of the counter shaft 112, and a bevel driven gear 123 formed integrally at one end portion of the shaft mounting member 125. The shaft mounting member 125 has a fixing hole 125b formed in an end face at one end portion, and a spline 125a formed at the other end portion. A support shaft 126 is mounted in the fixing hole 125b. The support shaft 126 is rotatably supported by a bearing 146 provided in the interior of the bevel gear case 6. A shaft main body extends toward the rear wheel and is mounted to the spline 125a. The shaft main body and the shaft mounting member 125 constitute a propeller shaft. The shaft mounting member 125 is mounted to the bevel gear case 6 in advance. Further, bearings 144, which support the left end portion of the counter shaft 112 in which the bevel drive gear 122 is formed, is held by a bearing holder 130. The bearing holder 130 is mounted to the bevel gear case 6 in advance, and the bevel gear train 121 is accommodated in the bevel gear case 6 in an intermeshed state in advance.

Further, the left end portion of the main shaft 111 is supported on the bevel gear case 6, so the main shaft 111 is assembled onto the bevel gear case 6 in advance with the transmission gear trains G1 to G6 being in meshing engagement. Further, the left end portions of the shift spindle 114, shift drum 116, and fork shaft 118 are also supported on the bevel gear case 6 in advance.

In this embodiment, the main shaft 111, the counter shaft 112, the transmission gear trains G1 to G6, the shift drum mechanism 113, the bevel gear train 121, the propeller shaft mounting member 125, the bearing holder 130, and the release mechanism 150 are assembled onto the bevel gear case 6 in advance. By mounting the bevel gear case 6 as described above so as to cover a mounting opening 4m of the lower case 4, the components of the power transmission mechanism TM are accommodated in the interior space of the transmission case portion 4B. At this time, the right end portions of the main shaft 111, counter shaft 112, shift spindle 116, shift drum 117, and fork shaft 119 are supported onto the lower case 4. Thereafter, the primary driven gear 103 and the multiple disc clutch 105 are mounted from the right end portion of the main shaft 111, and the side cover 5 is coupled so as to cover the right side surface of the lower case 4.

As described above, the bevel gear case 6 is coupled to the lower case 4 with the components of the power transmission mechanism TM being previously assembled onto the bevel gear case 6. This ensures great ease of assembly of the transmission gear trains G1 to G6 and bevel gear train 120, and allows the power transmission mechanism TM to be easily accommodated into the housing H for assembly.

Figure 14:
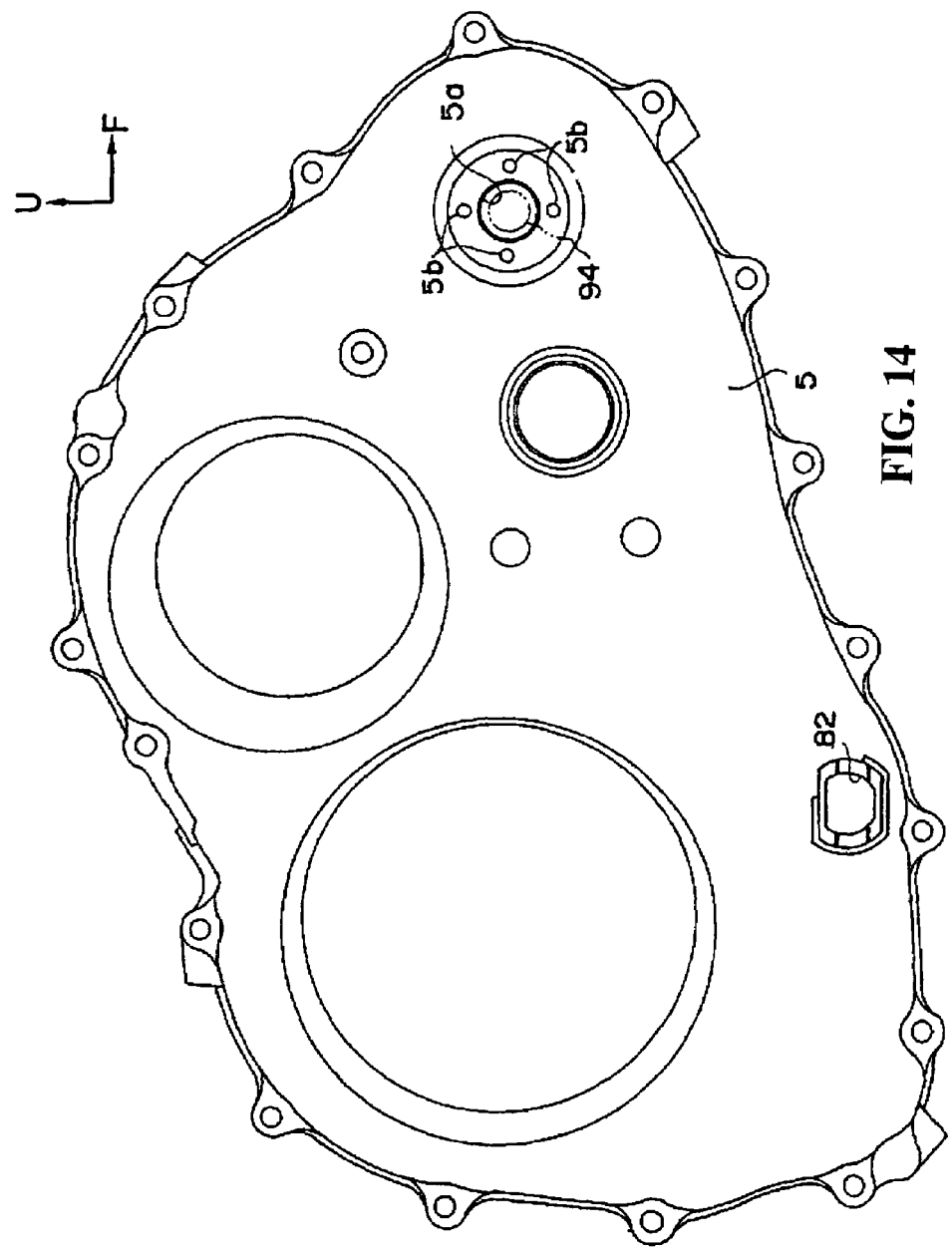
FIG. 14 is a right side sectional view of a side cover.

FIG. 14 is a right side sectional view of a side cover 5 with an extraction opening 82. After performing the backlash adjustment, an idle shaft fixing plate having a screw hole formed at the central portion thereof is attached from the outside of the side cover 5. A thread is formed in the outer peripheral surface of the projecting portion 94. Using the screw hole at the central portion thereof, the idle shaft fixing plate is brought into threaded engagement with the projecting portion 94, whereby the second idle shaft is fixed with respect to the idle shaft fixing plate. Further, an arcuate elongated hole is formed in the idle shaft fixing plate. A bolt is inserted from this elongated hole into a screw hole 5b formed in the periphery of the retention hole of the side cover 5, whereby the idle shaft fixing plate is fixed with respect to the side cover 5. The second idle shaft thus functions as a stationary shaft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A balancer mechanism for an internal combustion engine, comprising:
   a piston;

a cylinder block having the piston reciprocably disposed within a cylinder chamber formed in an interior of the cylinder block, the cylinder block being disposed so that an axis of the cylinder chamber is tilted in a substantially horizontal direction;

a crankshaft accommodated in an interior space of a crankcase coupled to the cylinder block, and rotates in synchronization with the piston;

a single balancer shaft that rotates in synchronization with the crankshaft; and a balancer weight provided to the balancer shaft and rotating integrally with the balancer shaft, for canceling out vibration resulting from reciprocating motion of the piston, wherein the crankcase is formed by joining upper and lower case halves together, the upper case half is coupled to the cylinder block, and a joining surface between the upper and lower case halves is formed so as to extend substantially vertically as seen in side view; and the balancer shaft is located below the crankshaft, and the crankshaft and the balancer shaft are sandwiched and supported between the upper and lower case halves with their center axes being located on the joining surface.

2. The balancer mechanism for an internal combustion engine according to claim 1, wherein an oil sump that stores a lubricating oil is coupled to a lower part of the lower case half;

a pump shaft and a pump drive mechanism are provided in an interior space of the lower case half, the pump shaft being disposed so as to be located in a rear of the balancer shaft, the pump drive mechanism transmitting rotation of the balancer shaft to the pump shaft; and an oil pump is provided to the pump shaft, the oil pump being driven by rotation of the pump shaft to pump the lubricating oil from the oil sump.

3. The balancer mechanism for an internal combustion engine according to claim 2, wherein a water pump is provided to the pump shaft, the water pump being driven by rotation of the pump shaft to supply cooling water to a water jacket formed in the periphery of the cylinder chamber.

4. A balancer mechanism for an internal combustion engine, comprising:

a piston:

a cylinder block having the piston reciprocably disposed within a cylinder chamber formed in an interior of the cylinder block, the cylinder block being disposed so that an axis of the cylinder chamber is tilted in a substantially horizontal direction;

a crankshaft accommodated in an interior space of a crankcase coupled to the cylinder block, and rotates in synchronization with the piston;

a balancer shaft that rotates in synchronization with the crankshaft: and a balancer weight provided to the balancer shaft and rotating integrally with the balancer shaft, for canceling out vibration resulting from reciprocating motion of the piston, wherein the crankcase is formed by joining upper and lower case halves together, the upper case half is coupled to the cylinder block, and a joining surface between the upper and lower case halves is formed so as to extend substantially vertically as seen in side view; and the balancer shaft is located below the crankshaft, and the crankshaft and the balancer shaft are sandwiched and supported between the upper and lower case halves with their center axes being located on the joining surface, wherein the internal combustion engine includes a cam shaft and a cam drive mechanism, the cam shaft being rotatably mounted in an interior of the cylinder head and adapted to actuate, in accordance with its rotation, a valve for performing suction and exhaust with respect to a combustion chamber, the cam drive mechanism transmitting rotation of the crankshaft to the cam shaft;

the cam drive mechanism includes a cam drive gear provided to the crankshaft, an idle shaft provided between the crankshaft and the camshaft, an idle gear train provided to the idle shaft and rotating integrally with the cam drive gear, and a chain drive mechanism provided between the idle shaft and the cam shaft to transmit rotation of the idle gear train to the camshaft; and the balancer shaft and the idle shaft are common to each other, and the balancer weight and gears forming the idle gear train are arranged coaxially with each other.

5. The balancer mechanism for an internal combustion engine according to claim 1, wherein an outer surface of the balancer shaft contacts an outer surface of the crankshaft.

6. A balancer mechanism for an internal combustion engine, comprising:

a piston;

a cylinder block having the piston reciprocably disposed within a cylinder chamber formed in an interior of the cylinder block, the cylinder block being disposed so that an axis of the cylinder chamber is tilted in a substantially horizontal direction;

a crankshaft accommodated in an interior space of a crankcase coupled to the cylinder block, and rotates in synchronization with the piston;

a balancer shaft that rotates in synchronization with the crankshaft, there being no balancer shaft above the crankshaft; and a balancer weight provide to the balancer shaft and rotating integrally with the balancer shaft, for canceling out vibration resulting from reciprocating motion of the piston, wherein the crankcase is formed by joining upper and lower case halves together, the upper case half is coupled to the cylinder block, and a joining surface between the upper and lower case halves is formed so as to extend substantially vertically as seen in side view; and the balancer shaft is located below the crankshaft, and the crankshaft and the balancer shaft are sandwiched and supported between the upper and lower halves with their center axes being located on the joining surface.

* * * * *